United States Patent
Tensmeyer et al.

(10) Patent No.: US 11,544,503 B2
(45) Date of Patent: Jan. 3, 2023

(54) DOMAIN ALIGNMENT FOR OBJECT DETECTION DOMAIN ADAPTATION TASKS

(71) Applicant: Adobe Inc., San Jose, CA (US)

(72) Inventors: Christopher Tensmeyer, San Jose, CA (US); Vlad Ion Morariu, Potomac, MD (US); Varun Manjunatha, San Jose, CA (US); Tong Sun, San Ramon, CA (US); Nikolaos Barmpalios, San Jose, CA (US); Kai Li, San Jose, CA (US); Handong Zhao, San Jose, CA (US); Curtis Wigington, San Jose, CA (US)

(73) Assignee: Adobe Inc., San Jose, CA (US)

( * ) Notice: Subject to any disclaimer, the term of this patent is extended or adjusted under 35 U.S.C. 154(b) by 186 days.

(21) Appl. No.: 16/885,168

(22) Filed: May 27, 2020

(65) Prior Publication Data

US 2021/0312232 A1  Oct. 7, 2021

Related U.S. Application Data

(60) Provisional application No. 63/005,990, filed on Apr. 6, 2020.

(51) Int. Cl.
*G06K 9/00* (2022.01)
*G06K 9/62* (2022.01)
(Continued)

(52) U.S. Cl.
CPC ........... *G06K 9/6257* (2013.01); *G06K 9/628* (2013.01); *G06K 9/6232* (2013.01);
(Continued)

(58) Field of Classification Search
None
See application file for complete search history.

(56) References Cited

U.S. PATENT DOCUMENTS 8,498,448 B2 *  7/2013  Feris ............... G06V 20/41
                                           348/169
8,983,133 B2 *  3/2015  Feris ............... G06T 7/73
                                           382/103
(Continued)

FOREIGN PATENT DOCUMENTS

CN         111340021 A   *  6/2020   ........... G06K 9/3233
CN         111698152 A   *  9/2020   ........... H04L 12/4633
WO    WO-2009115530 A1   *  9/2009   ........... G06T 7/2006

OTHER PUBLICATIONS

Alqasir et al., "Region proposal oriented approach for domain adaptive object detection." In International Conference on Advanced Concepts for Intelligent Vision Systems Feb. 10, 2020 (pp. 38-50). Springer, Cham. (Year: 2020).*

(Continued)

*Primary Examiner* — Feng Niu
(74) *Attorney, Agent, or Firm* — Keller Preece PLLC

(57) ABSTRACT

A domain alignment technique for cross-domain object detection tasks is introduced. During a preliminary pretraining phase, an object detection model is pretrained to detect objects in images associated with a source domain using a source dataset of images associated with the source domain. After completing the pretraining phase, a domain adaptation phase is performed using the source dataset and a target dataset to adapt the pretrained object detection model to detect objects in images associated with the target domain. The domain adaptation phase may involve the use of various domain alignment modules that, for example, perform multi-scale pixel/path alignment based on input feature maps or perform instance-level alignment based on input region proposals.

20 Claims, 13 Drawing Sheets
(3 of 13 Drawing Sheet(s) Filed in Color)

(51) Int. Cl.
*G06N 5/04* (2006.01)
*G06V 30/40* (2022.01)
(52) U.S. Cl.
CPC .......... *G06K 9/6262* (2013.01); *G06N 5/046* (2013.01); *G06V 30/40* (2022.01)

(56) References Cited

U.S. PATENT DOCUMENTS

| | | | | |
|---|---|---|---|---|
| 9,984,315 | B2* | 5/2018 | Gaidon | G06V 30/194 |
| 10,901,740 | B2* | 1/2021 | Planche | G06T 7/50 |
| 11,068,786 | B1* | 7/2021 | Liu | G06N 3/082 |
| 11,379,985 | B2* | 7/2022 | Wang | G06N 3/08 |
| 2013/0016877 | A1* | 1/2013 | Feris | G06T 7/246 |
| | | | | 382/103 |
| 2013/0272573 | A1* | 10/2013 | Feris | G06V 20/41 |
| | | | | 382/103 |
| 2016/0078359 | A1* | 3/2016 | Csurka | G06K 9/6215 |
| | | | | 706/12 |
| 2019/0325299 | A1* | 10/2019 | Oliveira Pinheiro | |
| | | | | G06N 3/0472 |
| 2020/0134833 | A1* | 4/2020 | Biswas | G06V 10/267 |
| 2020/0167161 | A1* | 5/2020 | Planche | G06F 9/328 |
| 2020/0167930 | A1* | 5/2020 | Wang | G06T 7/0012 |
| 2020/0356712 | A1* | 11/2020 | Rejeb | G06F 30/17 |
| 2021/0056693 | A1* | 2/2021 | Cheng | G06V 10/82 |
| 2021/0216913 | A1* | 7/2021 | Zhang | G06F 16/53 |
| 2021/0279513 | A1* | 9/2021 | Jie | G06K 9/6256 |

OTHER PUBLICATIONS

Lin et al., "Feature pyramid networks for object detection." In Proceedings of the IEEE conference on computer vision and pattern recognition, pp. 2117-2125. 2017. (Year: 2017).*
Li et al., "Semi-Supervised Domain Adaptation by Covariance Matching," in IEEE Transactions on Pattern Analysis and Machine Intelligence, vol. 41, No. 11, pp. 2724-2739, Nov. 1, 2019, doi: 10.1109/TPAMI.2018.2866846. (Year: 2019).*
Hoffman et al., "FCNs in the wild: Pixel-level adversarial and constraint-based adaptation." arXiv preprint arXiv:1612.02649 (2016). (Year: 2016).*
Meier et al., "Fully Convolutional Neural Networks for Newspaper Article Segmentation," 2017 14th IAPR International Conference on Document Analysis and Recognition (ICDAR), 2017, pp. 414-419, doi: 10.1109/ICDAR.2017.75. (Year: 2017).*
Li et al., "Heterogeneous domain adaptation via nonlinear matrix factorization." IEEE transactions on neural networks and learning systems 31, No. 3 (2019): 984-996. (Year: 2019).*
Shi et al., "Information-theoretical learning of discriminative clusters for unsupervised domain adaptation." arXiv preprint arXiv:1206.6438 (2012). (Year: 2012).*
Saito et al., "Semi-supervised domain adaptation via minimax entropy." In Proceedings of the IEEE/CVF International Conference on Computer Vision, pp. 8050-8058. 2019. (Year: 2019).*
Larsson et al., "Fine-grained segmentation networks: Self-supervised segmentation for improved long-term visual localization." In Proceedings of the IEEE/CVF International Conference on Computer Vision, pp. 31-41.2019. (Year: 2019).*
Roldano Cattoni, et al., Geometric layout analysis techniques for document image understanding: a review. ITC-irst Technical Report, 9703(09), 1998.
Utpal Garain. Identification of mathematical expressions in document images. In ICDAR, 2009.
Xiaoyan Lin, et al., Mathematical formula identification in pdf documents. In ICDAR, 2011.
Jing Fang, et al., Dataset, ground-truth and performance metrics for table detection evaluation. In DAS, 2012.
Andreas Geiger, et al., Vision meets robotics: The kitti dataset. The International Journal of Robotics Research, 32 (11):1231-1237., 2013.

Max Göbel, et al., Icdar 2013 table competition. In ICDAR, 2013.
Dieu Ni Tran, et al., Table detection from document image using vertical arrangement of text blocks. International Journal of Contents, 11(4):77-85, 2015.
Kaiming He, et al., Deep residual learning for image recognition. In CVPR, 2015.
Yaroslav Ganin et al., Unsupervised domain adaptation by backpropagation. In ICML, 2015.
Deepak Pathak, et al., Context encoders: Feature learning by inpainting. In CVPR, 2016.
Marius Cordts et al.; The cityscapes dataset for semantic urban scene understanding. In CVPR, 2016.
Shaoqing Ren, et al., Faster r-cnn: Towards real-time object detection with region proposal networks. In NuerIPS, 2016.
Adam Paszke, et al., Automatic differentiation in pytorch, 2017.
Azka Gilani, et al., Table detection using deep learning. In ICDAR, 2017.
Dafang He, et al., Multi-scale multi-task fen for semantic page segmentation and table detection. In ICDAR, 2017.
Liangcai Gao, et al., A deep learning-based formula detection method for pdf documents. In ICDAR, 2017.
Liangcai Gao, et al., Icdar2017 competition on page object detection. In ICDAR, 2017.
Liang-Chieh Chen et al. Deeplab: Semantic image segmentation with deep convolutional nets, atrous convolution, and fully connected crfs. IEEE Transactions on Pattern Analysis and Machine Intelligence, 40(4):834 848, 2017.
Ning Liu, et al., Robust math formula recognition in degraded Chinese document images. In ICDAR, 2017.
Sebastian Schreiber, et al., Deepdesrt: Deep learning for detection and structure recognition of tables in document images. In ICDAR, 2017.
Tsung-Yi Lin, et al., Feature pyramid networks for object detection. In CVPR, 2017.
Xiao Yang, et al., Learning to extract semantic structure from documents using multimodal fully convolutional neural networks. In CVPR, 2017.
Xiaohan Yi, et al., CNN based page object detection in document images. In ICDAR, 2017.
Naoto Inoue, et al., Cross-domain weakly-supervised object detection through progressive domain adaptation. In CVPR, 2018.
Peter WJ Staar, et al., Corpus conversion service: A machine learning platform to ingest documents at scale. In KDD, 2018.
Tsung-Yi Lin, et al., Focal loss for dense object detection. In ICCV, 2018.
Xiao-Hui Li, et al., Page object detection from pdf document images by deep structured prediction and supervised clustering. In ICPR, 2018.
Yuhua Chen, et al., Domain adaptive faster r-cnn for object detection in the wild. In CVPR, 2018.
Xu Zhong, et al., Publaynet: largest dataset ever for document layout analysis. arXiv preprint arXiv:1908.07836, 2019.
Aruni RoyChowdhury, et al., Automatic adaptation of object detectors to new domains using self-training. In CVPR, 2019.
Kuniaki Saito, et al., Strong-weak distribution alignment for adaptive object detection. In CVPR, 2019.
Mehran Khodabandeh, et al., A robust learning approach to domain adaptive object detection. In ICCV, 2019.
Seunghyeon Kim, et al., Self-training and adversarial background regularization for unsupervised domain adaptive one-stage object detection. In ICCV, 2019.
Taekyung Kim, et al., Diversify and match: A domain adaptive representation learning paradigm for object detection. In CVPR, 2019.
Xinge Zhu, et al., Adapting object detectors via selective crossdomain alignment. In CVPR, 2019.
Zhenwei He, et al., Multi-adversarial faster-rcnn for unrestricted object detection. In ICCV, 2019.
Jun-Yan Zhu, et al., Unpaired image-to-image translation using cycleconsistent adversarial networks. In ICCV, 2020.

* cited by examiner

DOMAIN ALIGNMENT FOR OBJECT DETECTION DOMAIN ADAPTATION TASKS

CROSS-REFERENCE OF RELATED APPLICATIONS

This application claims the benefit of U.S. Provisional Application No. 63/005,990 titled, "DOMAIN ALIGNMENT FOR OBJECT DETECTION DOMAIN-ADAPTATION TASKS", filed on Apr. 6, 2020, the contents of which are hereby incorporated by reference in their entirety for all purposes. This application is therefore entitled to a priority date of Apr. 6, 2020.

TECHNICAL FIELD

The disclosed teachings generally relate to the field of machine-learning based object detection in digital images. The disclosed teachings more particularly relate to a domain alignment technique for cross-domain object detection tasks.

BACKGROUND

Object Detection is the task of automatically detecting, using a computer system, objects in an image or scene. Document Object Detection (DOD) is specific type of object detection and includes the task of automatically decomposing a document page image into its structural and logical units (e.g., figures, tables, paragraphs). Object detection in general, and DOD in particular, are critical for a variety of image analysis applications, such as document/image editing, document structure analysis, and content understanding.

BRIEF DESCRIPTION OF THE DRAWINGS

The patent or application file contains at least one drawing executed in color. Copies of this patent or patent application publication with the color drawing(s) will be provided by the Office upon request and payment of the necessary fee.

DETAILED DESCRIPTION

1. Overview

Despite recent advances in object detection, existing models are limited in their abilities to effectively detect objects across multiple domains. This is particularly true in the context of DOD where directly applying a single model to document images can produce sub-optimal results due to large domain differences. For example, document objects can be more diverse in aspect ratio and scale than natural scene objects: tables may occupy a whole page, page numbers can be as small as a single digit, and a single line of text spanning the page has an extreme aspect ratio. The intra-class variance of document objects is also usually larger than that of natural scene objects. Text can have arbitrary font face, style, position, orientation, and size. Table cells can be filled with arbitrary content as long as they are aligned in a grid layout. Document layouts and objects are also modular entities, so that, for example, examining the left half of a paragraph gives little information on how wide that paragraph is.

Many factors influence the appearance of a document, such as document type (e.g., menu, scientific article), layout (e.g., portrait vs. landscape or single/multi-column), and written language. Accordingly, due to large domain differences, an object detection model trained using labeled image data in one domain may produce sub-optimal results when applied to detect objects using images in another domain. Consider, for example, the problem of training a model to detect objects in images of documents in various languages (i.e., different domains). In the example scenario, a labeled dataset of documents in English is available (e.g., images and bounding boxes) to train the model; however, the model must be trained to detect objects in documents in another language such as Chinese. A dataset of documents in Chinese is available; however, none of them are labeled. Accordingly, the unlabeled dataset of documents in Chinese cannot be used to train the model using traditional supervised learning techniques. Such a scenario is quite common since it takes time and effort to label datasets resulting in few large labeled datasets and many unlabeled datasets. While training a single model to handle all varieties of documents is desirable, constructing such a comprehensive dataset is at best impractical and at worst unfeasible.

Figure 1:
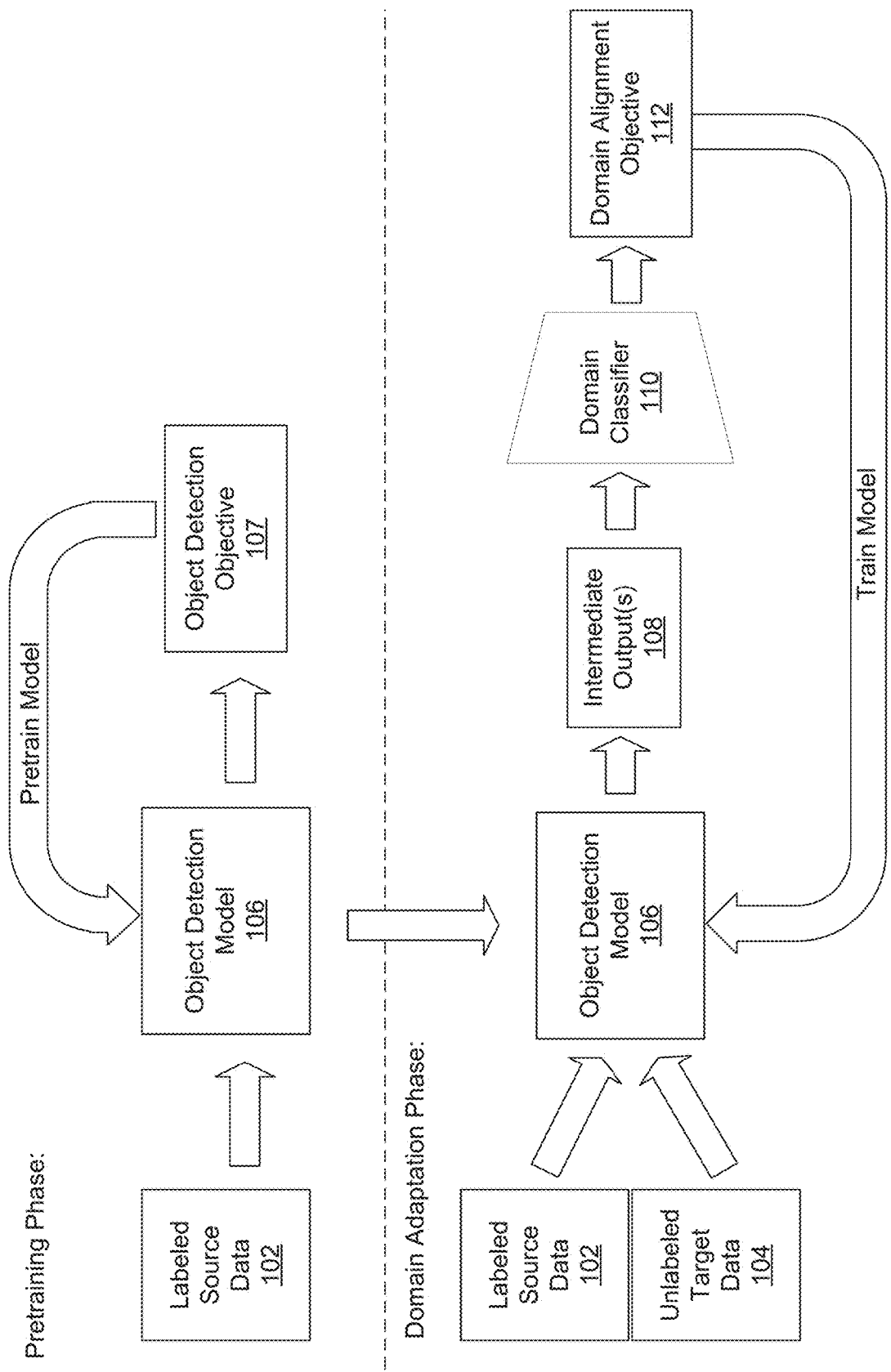
FIG. 1 shows a flow diagram that illustrates, at a high level, the concept of domain alignment, according to an embodiment of the introduced technique.

To address these problems, a technique is introduced for adapting a model for cross-domain object detection. The introduced technique can be applied to leverage labeled data in a source domain and unlabeled data in a target domain to train an object detection model for the target domain. FIG. 1 shows a flow diagram that illustrates, at a high level, the domain alignment concept behind the introduced technique.

As shown in FIG. 1, during a pretraining phase, an object detection model 106 is trained using labeled source data 102. The labeled source data can include labeled image data in a source domain such as a labeled dataset of documents in English. The object detection model 106 can be pretrained using any supervised learning technique and an object detection objective (ODO) 107. This pretraining phase may ignore any unlabeled target data 104 which can include image data in a target domain such as an unlabeled dataset of documents in Chinese. This pretraining phase results in a model that is trained to detect objects in images in the source domain, but not in the target domain.

After completing the pretraining phase, a domain adaptation phase of the training is performed. During the domain adaptation phase, the object detection model is jointly trained using both the labeled source data 102 and the unlabeled target data 104. For example, both the labeled source data 102 and the unlabeled target data 104 are input into the object detection model 106 to produce intermediate outputs 108 such as feature maps or region proposals.

In this context, an "intermediate output" may refer to an output of a component of the object detection model 106 other than a final object detection inference. For example, feature maps and/or regions proposals may be used as intermediate outputs in a processing pipeline of an overall network of the object detection model to generate a final object detection inference such as a bounding box and object classification. A "feature map" may represent an output from resulting from applying a filter in a layer in a network to an input image. For example, a feature map may represent an output from one of the hidden layers in a convolutional neural network (CNN) based on an input image. A feature map may also represent one of multiple feature maps in a feature pyramid output by a Feature Pyramid Network (FPN). The feature maps may include pixel data that are indicative of any one or more different features includes lower-level features (e.g., colors, edges, etc.) and higher-level features (e.g., shapes, objects, etc.). A "region proposal" may represent an output indicative of a region in an image where an object is proposed, predicted, or otherwise determined to reside. A region proposal may be represented by a proposed bounding box that surrounds the proposed region of the image where the object is proposed, predicted, or otherwise determined to reside. In some embodiments, a region proposal is generated using a Region Proposal Network (RPN) based on input feature maps (or an input feature pyramid).

The intermediate outputs 108 can then be used to train the object detection model 106 to produce domain-agnostic intermediate outputs. For example, a domain alignment objective 112 can be used as an objective function to train the object detection model 106 to produce domain-agnostic intermediate outputs such as domain-agnostic feature maps or domain-agnostic region proposals.

The domain alignment objective 112 can be based on the intermediate outputs 108 generated using the object detection model. For example, in some embodiment, the intermediate outputs 108 are fed into one or more domain classifiers 110 that are trained to predict or determine whether a given intermediate output is associated with the source domain or the target domain. Domain classification outputs from the one or more domain classifiers 110 may be applied as part of the domain adaptation objective 112 that can be used as an objective function to update the object detection model 106, for example, by adjusting one or more parameters of the object detection model 106 during training. For illustrative simplicity, the term "objective function" is used throughout this application to refer to training objectives; however, the term "objective function" shall be understood to include any type of functions including loss functions, cost functions, reward functions, etc.

Because there are characteristic appearance differences between source and target images, the images from each domain will naturally produce different distributions over features unless the object detection model 106 is explicitly penalized for doing so. This is the role of the one or more domain classifiers 110, in this process. The one or more domain classifiers 110 can be trained as binary classifiers to discriminate whether certain features came from a source image or a target image. The parameters of the one or more domain classifiers 110 are trained to be good at this domain classification task without changing the parameters of the object detection model 106. This allows the object detection model 106 to use the one or more domain classifiers 110 as part of a domain alignment objective term. Keeping the parameters of the one or more domain classifiers 110 fixed, one or more parameters of the object detection model 106 are adjusted to minimize or otherwise reduce the accuracy of the one or more domain classifiers 110. In other words, the object detection model 106 is updated to fool the one or more domain classifiers 110 by forcing the feature distributions of the source and target domains to be the same. Intuitively, this helps the object detection model 106 focus on the commonalities of the domains and not encode the differences of the domains in the features. In this way, the object detection model 106, originally pretrained for the source domain, is updated to work on the target domain.

Use of a domain classifier 110 represents one way to perform domain alignment based on the intermediate outputs, but is not to be construed as limiting. Any other technique for domain alignment can similarly be applied. For example, in some embodiments, statistics based on the intermediate outputs 108 can be generated. Such statistics can include, for example, standard deviation between intermediate outputs based on source and target data, source and target covariance matrices, or any other applicable statistical information. In such embodiments, the statistics generated based on the intermediate outputs can be applied as an objective function to train the object detection model 106. For example, the object detection model can be trained to minimize a loss function where the statistics indicated differences between intermediate outputs based on source and target data.

Further, while FIG. 1 depicts the application of "unlabeled" data in the target domain, the technique is not limited to unlabeled data. The process of FIG. 1 may similarly be performed using partially labeled and/or labeled data in the target domain. For example, a semi-supervised domain adaptation technique may apply labeled data and/or partially labeled data in the target domain to train the object detection model during the pretraining phase and/or the domain adaptation phase.

The flow diagram of FIG. 1 is depicted in simplified terms for clarity and is not intended to be limiting or to depict all aspects of the introduced technique. Various embodiments of the introduced technique may include more or fewer operations than are described with respect to FIG. 1.

2. Definitions

Domains: Reference is made throughout this application to "domains." As used herein, a "domain" may refer to any distinct subset of data that shares some common characteristic or trait. A domain may, for example, be associated with an image type, an image format, a document type, a document format, a language, an industry, a source, an image quality, or any other type of characteristic or trait. For example, a set of documents in English may be considered to be associated with a particular language domain, namely, the "English" domain. In this context, being "associated with" a domain means that a portion of data (e.g., a digital image) shares the characteristic or trait that is common to the domain. Data may be associated with more than one domain. For example, a document in the aforementioned set of English documents may be a financial document and may therefore also be associated with an industry-specific domain, namely, finance. These are just illustrative examples of domain types and are not to be construed as limiting. Other types of domains can similarly be specified based on some other common characteristic.

Source Domain vs. Target Domain: Reference is made throughout this application to a "source domain" and a "target domain." This is intended to refer to which domain is common to the data used to initially pretrain an object detection model (i.e., the source domain) and which domain the model is being adapted for (i.e., the target domain). It is understood that the source domain and target domain are different than each other. In some embodiments, the source domain and target domain may be different than each other but may correspond to the same domain type or category. For example, the "English" domain is different than the "Chinese" domain, but both are language domains. In some situations, the source domain and target domain may be of different domain types or categories. For example, a source domain may be "English" while the target domain is "legal documents." As previously stated, data may be associated with more than one domain. Accordingly, association with one domain is not mutually exclusive to another domain. A portion of data (e.g., a digital image) may be associated with both the source and target domain. For example, if the source domain is "English" and the target domain is "legal documents," a legal document in English may be associated with both the source and target domain.

Source Data Vs. Target Data:

Reference is made throughout this application to "source data" and "target data." As used herein, "source data" refers to data associated with a source domain and "target data" refers to data associated with a target domain. In some embodiments, source data (e.g., source data 102) may include a source dataset of one or more digital images that are associated with a source domain. Similarly, target data (e.g., target data 104) may include a target dataset of one or more digital images that are associated with a target domain. "Images" may include any type of digital image data. For example, images may include digital documents (e.g., PDF files), digital scans, digital artwork (e.g., raster or vector based), digital natural scene images (e.g., digital photographs), or any other type of image data. Images may include static images such as digital photographs and/or dynamic images such as digital video. Digital image data may be in any type of format. Some digital image data may be in the form of pixel data such as scanned images or digital photographs. Other digital image data may be in the form of encoded document structure. For example, Portable Document Format (PDF) files consist of vector, raster, and text marking operations that allow a document to be faithfully reproduced across devices (e.g., printers, and displays). While PDF files and other document representation formats do not include pixel data, they shall be understood to be included within the meaning of "digital image data" for the purposes of this disclosure. Some example digital image formats include Joint Photographic Experts Group (JPEG), Graphics Interchange Format (GIF), Tagged Image File Format (TIFF), PDF, Adobe Illustrator™ (AI), Scalable Vector Graphics (SVG), Moving Pictures Expert Group 4 (MP4), Audio Video Interleave (AVI), and Windows Media Video (WMV). This is just an illustrative list of digital image formats and is not to be construed as exhaustive.

In some cases, the source data is referred to as "labeled source data." As used herein, "labeled source data" refers to data that is labeled, annotated, tagged or otherwise indicated for ground truth information. For example, a labeled digital image may include a label in the form of a bounding box that surrounds a region of the digital image where an object resides. In some cases, the target data is referred to as "unlabeled target data." Target data may be referred to as "unlabeled" to indicate that the data may actually include no labels or may be insufficiently labeled for use as a sole training dataset to specifically train an object detection model to make inferences based on images in a target domain. In practice, even where referred to as "unlabeled," data in a target dataset may actually include various labels, annotations, tags, metadata, or other indicators.

Objects:

Reference is made throughout this paper to "objects" in the context of detecting objects in digital image data. As used herein "objects" may refer to virtual objects such as graphical objects in a digital artwork or logical portions of a document (e.g., letter, word, paragraph, text, list, heading, figure, table, etc.). "Objects" may also refer to physical objects that are captured in digital images of natural scenes. For example, physical objects may include people, animals, vehicles (e.g., cars, planes, boats, etc.), buildings or other manmade structures, plants and other vegetation, landscape features (e.g., mountains, rivers, etc.), and any other physical objects that may reside in the physical environment.

3. Adapting a Model for Cross-Domain Object Detection

Figure 2:
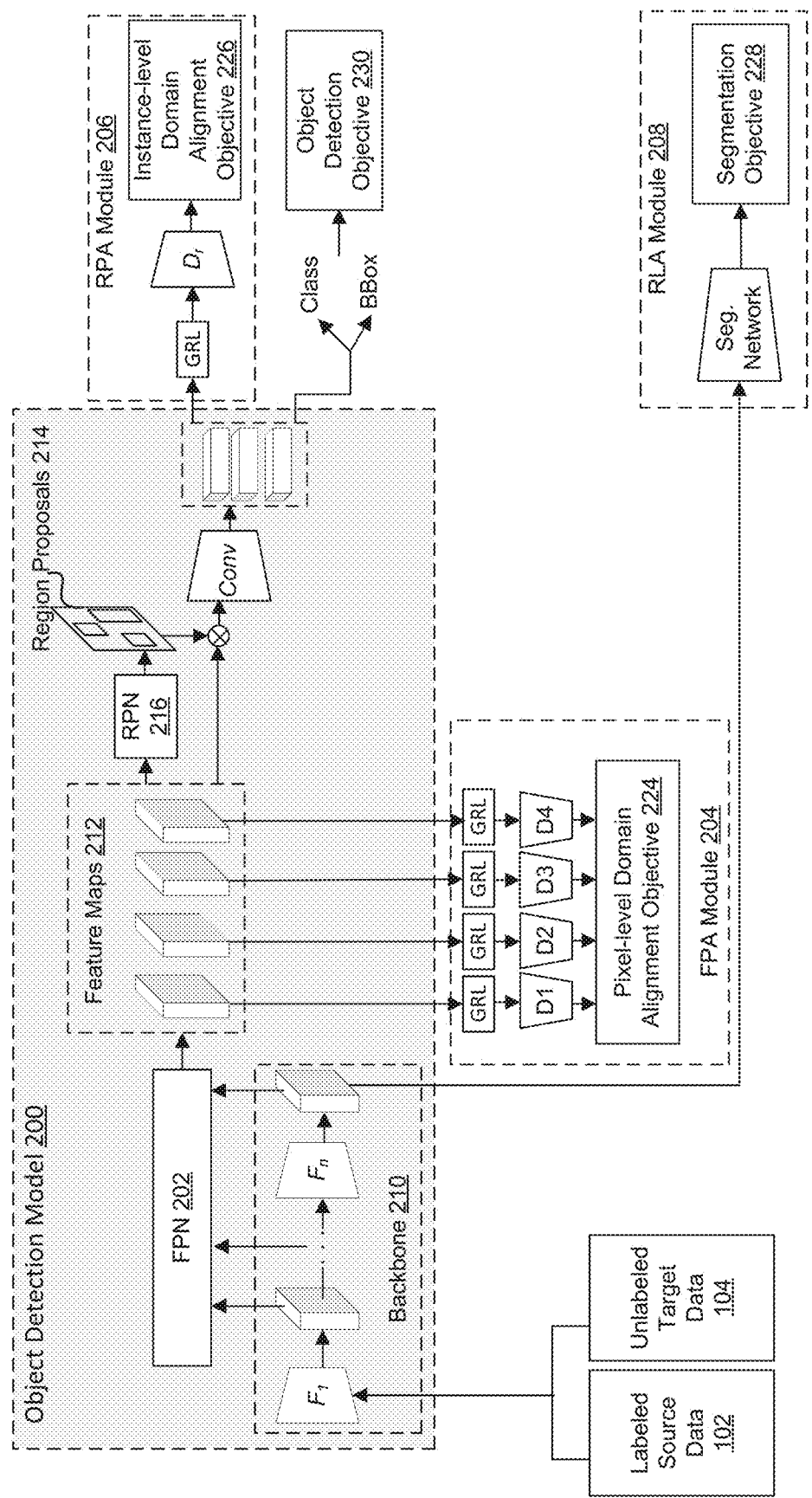
FIG. 2 shows an architecture flow diagram of an example process for adapting an object detection model for cross-domain object detection.

FIG. 2 shows a flow diagram of an example process for adapting an object detection model 200 for cross-domain object detection. The example object detection model 200a depicted in FIG. 2 includes an FPN 202; however, the introduced technique can be applied to other types of artificial neural networks suitable for object detection in image data. The example process also involves the use of one or more different modules for domain alignment. Specifically, the example process depicted in FIG. 2 includes the user of a Feature Pyramid Alignment (FPA) module 204, a Region Proposal Alignment (RPA) module 206, and a Rendering Layer Alignment (RLA) module 208.

The object detection model 200 and process depicted in FIG. 2 is an example provided for illustrative purposes and is not to be construed as limiting. An object detection model that is adapted for cross-domain object detection may include more or fewer modules than are depicted in FIG. 2 and may arrange the modules differently. For example, as mentioned above, some object detection models may not include an FPN 202. Further, while the process depicted in FIG. 2 involves the use of three different modules for domain alignment namely FPA module 204, RPA module 206, and RLA module 208, each of these modules may not be necessary in all embodiments. For example, some embodiments of the introduced technique may only apply operations associated with the FPA module 204 and/or the RPA module 206.

3.1 Feature Pyramid Network

An FPN is a feature extractor that generates multiple feature map layers (multi-scale feature maps). The FPN 202 exploits the pyramidal feature hierarchy of a CNN to build a feature pyramid of high-level semantics for all the layers. The FPN 202 may be a module that is independent of the backbone convolutional architecture 210 that includes $F_1$ through $F_n$. In some embodiments, ResNet-101 can be implemented as the backbone 210.

Figure 3:
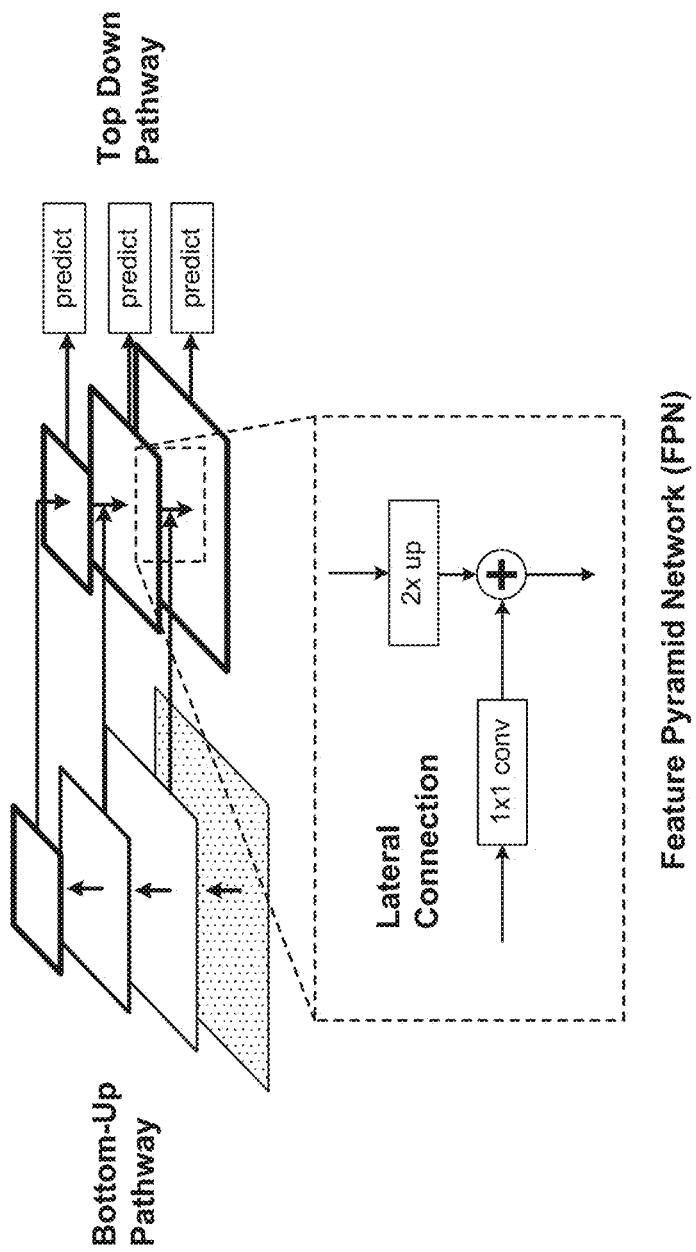
FIG. 3 shows a diagram of an example Feature Pyramid Network (FPN)

FIG. 3 shows a diagram of an example FPN 202. The FPN 202 combines multiple scale features (taken from various places in the backbone 210) and performs bottom-up and top-down operations. Returning to FIG. 2, the FPN 202 outputs distinct feature maps 212 at several different resolutions. With the feature hierarchy $\{C_1, C_2, C_3, C_4\}$ from the various layer outputs (e.g., layer1, layer2, layer3, and layer4) of the backbone 210, FPN 202 iterates from the coarsest feature map, up-samples it by a factor of 2 for the spatial resolution, and merges it (by element-wise addition) with the preceding map, which has undergone a 1×1 convolution to reduce channel dimensions. The merged feature map is then smoothed by a 3×3 convolution to produce the final feature map. This iteration process outputs a feature pyramid $\{P_1, P_2, P_3, P_4\}$, that includes the various feature maps 212 where:

$$P_i = \text{conv3}(up\_sample(P_{i+1}) + \text{conv1}(C_i)), i=1,2,3,4, \qquad (1)$$

where conv1, conv3, and up_sample are 1×1, 3×3 and up-sampling operations, respectively. Note that $P_5$ is the result of 1×1 convolution on $C_4$, i.e., $P_5=\text{conv1}(C_4)$.

Region proposals 214 can then be extracted from all feature pyramid layers $\{P_1, P_2, P_3, P_4\}$ (i.e., feature maps 212) by an RPN 216. The obtained region proposals 214 can then be forwarded to a feature extraction module to obtain a feature vector for each proposal. For an image from the labeled source data 102, the objective function, or object detection objective 230, can be calculated using the bounding box ground truth:

$$L_{det}^s = L_{reg}(x^s, y^s) + L_{cls}(x^s, y^s), \qquad (2)$$

where $x^s$ and $y^s$ are the image and the ground truth annotation, respectively. The first term is the bounding box regression loss and the second term is the classification loss.

3.2 Feature Pyramid Alignment

The feature maps 212 in the pyramid can include a mixture of both high-level and low-level features. Aligning feature pyramids from different domains can therefore result in a joint alignment of both low-level and high-level semantics. This is advantageous over existing methods where alignment is merely performed for low-level features or high-level features, or both of them separately. Moreover, by virtue of building upon FPN 202, feature pyramid alignment can inherit the strength of FPN 202 for detecting objects of a wide range of sizes, which can be important for detecting objects in document images, as they can vary significantly in sizes. For example, some "text" objects can occupy almost a whole page (e.g., long paragraphs), while other objects may be as small as a few characters or digits (e.g., page numbers or short section headings).

In the example depicted in FIG. 2, the FPA module 204 can perform operations associated with feature pyramid alignment. The FPA module 204 can include multiple domain classifier into which intermediate outputs from the FPN 202 (e.g., feature maps 212) are fed. Specifically, FPA module 204 depicted in FIG. 2 includes four binary domain classifiers {D1, D2, D3, D4} that correspond to the four layers in the feature pyramid $\{P_1, P_2, P_3, P_4\}$ (i.e., feature maps 212 at different resolutions); however, this is not to be construed as limiting. Other embodiments of an FPA module 204 may include more or fewer domain classifiers depending on the configuration of the FPN 202. Each feature map 212 is input into a different one of the multiple domain classifiers {D1, D2, D3, D4} for processing. These domain classifiers {D1, D2, D3, D4} may be configured as per-pixel binary domain classifiers and trained to predict or otherwise determine domain labels (source or target) of the pixels in the input feature maps 212. In other words, the per-pixel binary domain classifiers can be implemented in the FPA module 204 to perform multi-scale pixel/patch alignment.

In some embodiments, the domain classifiers are combined with a Gradient Reversal Layer (GRL) which helps the object detection model 200a learn feature representations that are not domain discriminative. This helps map the source and target domains into a common feature space so that an object detector for the source domain will function as well for the target domain.

The domain classifiers {D1, D2, D3, D4} and FPN 202 can be trained in an adversarial manner such that the domain classifiers {D1, D2, D3, D4} cannot tell whether a given pixel in a feature map 212 is based on data from the source domain (e.g., labeled source data 102) or is based on data from the target domain (e.g., unlabeled target data 104). In other words, the FPN 202 can be trained using a pixel-level domain alignment objective 224 based on the outputs from the domain classifiers {D1, D2, D3, D4} to be domain-agnostic. To this end, the gradients can be reversed with respect to $\{P_1, P_2, P_3, P_4\}$ (i.e., feature maps 212) using GRLs to optimize the min-max problem in each individual back propagation.

In an example embodiment, the objective function, or pixel-level domain alignment objective 224, can be represented as follows:

$$\mathcal{L}_P = -\frac{1}{4W^sH^s}\sum_{i=1}^{4}\sum_{w=1}^{W^s}\sum_{h=1}^{H^s}\log(D_i(P_{i,w,h}^s)) - \qquad (3)$$

$$\frac{1}{4W^tH^t}\sum_{i=1}^{4}\sum_{w=1}^{W^t}\sum_{h=1}^{H^t}\log(1 - D_i(P_{i,w,h}^t)),$$

where $W^s$, $H^s$, $W^t$, and $H^t$ are the width and height of the source and target feature maps 212 (respectively) and $P_i^s$ and $P_i^t$ are the i-th layers of the source and target pyramids, respectively.

3.3 Region Alignment

As discussed above, the FPA module 204 performs pixel-wise dense alignment of the feature maps 212, which gives equal treatment to foreground and background regions. However, in certain contexts, for example in DOD, the foreground regions may be more pertinent, as they are more semantically meaningful to the detection task.

Region (or bounding box) proposals 214 are the likely foreground regions, so in some embodiments, the introduced technique can involve performing domain alignment on the region proposals 214. In the example depicted in FIG. 2, the RPA module 206 can perform operations associated with region alignment. Like the FPA module 204, the RPA module 206 can include a domain classifier $D_r$ into which intermediate outputs from the RPN 216 (e.g., region proposals 214) are fed. The domain classifier $D_r$ can also be configured as a binary domain classifier; however, whereas the domain classifiers {D1, D2, D3, D4} of the FPA module 204 are configured to make predictions at the pixel/patch level, the domain classifier $D_r$ is configured to examine higher level semantics by classifying a whole detected instance (i.e., region proposal) as being based on data from the source domain (e.g., labeled source data 102) or based on data from the target domain (e.g., unlabeled target data 104).

A weak global alignment of images from different domains can result in better cross-domain detection performance, due to the focus on images that are more difficult to align. In the context of aligning region proposals 214, focusing on the region proposals that are easier to classify and therefore align can cause those region proposals to dominate the objective function, which can lead to undesirable alignment results. Accordingly, in some embodiments, the RPA module 206 can be configured to give less weight to region proposals 214 that are easier to classify and greater weight to region proposals 214 that are more difficult to classify, thereby focusing alignment on the region proposals that are more difficult to align. A level of difficulty to classify a given region proposal can be based on a probability value associated with the output region proposal. For example, a region proposal may be designated as easy to classify if the associated probability value is close to 1 (e.g., 0.95). In other words, the probability close to one indicates a high level of probability that a given region proposal is associated with a particular domain (e.g., source domain). Conversely, a probability value that is close to 0 (e.g., 0.05) may indicate that the region proposal is difficult to classify.

In some embodiments, the weight can be applied automatically as part of the objective function using a technique called focal loss. In such embodiments, portions of the objective function are raised to a certain power >1 (e.g., determined a priori) so that, for example, smaller values are minimized more drastically than larger values (see e.g., the weighting factor γ in equation (4) below).

Further, in some cases, the region proposals 214 may be noisy or just wrong, which can negatively impact the overall performance of the object detection model 200a by attempting to align the source and target domains on noisy instances. In the domain classifier $D_r$ associated with the RPA module 206 can be weighted based on confidence scores, for example, output by the RPN 216. The confidence scores may indicate a likelihood that an object resides in a given region proposal. In other words, a low confidence score may indicate a low likelihood that an object resides in a given region proposal and a high confidence score may indicate a high likelihood that an object resides in a given region proposal. The RPA module 206 can therefore be configured to assign less weight to region proposals associated with lower confidence scores and greater weight to region proposals associated with higher confidence scores.

In an example embodiment, the objective function, or instance-level domain alignment objective 226, can be represented as follows:

$$\mathcal{L}_r = -\frac{1}{R}\sum_{i=1}^{R}(1-D_r(r_i^s))^\gamma \log(D_r(r_i^s)) - \frac{1}{R}\sum_{i=1}^{R}(D_r(r_i^t))^\gamma \log(1-D_r(r_i^t)), \quad (4)$$

where R is the number of region proposal extracted; the terms $r_i^s$ and $r_i^t$, are the i-th region proposals extracted from the source and target images, respectively; $D_r$ is the binary domain classifier; and, γ controls the weight on hard-to-align proposals. As in FPA module 204, the gradients are reversed with respect to the region proposals using a GRL, and the domain classifier $D_r$ and FPN 202 are trained in an adversarial manner in each individual back-propagation.

3.4 Rendering Layer Alignment

Some document formats are rendered using separate layers. For example, PDF documents are rendered into three separate layers, where each layer contains the pixels resulting from a single type of content, namely, text, vector, or raster. These layers provide information about the content within a page (e.g., a PDF page). More importantly, such layers may be available and consistent for images in the source domain and target domain, provided the images are in a suitable format (e.g., PDF). Thus, such layers can be used as an additional supervision cue to bridge domain gaps. The RLA module 208 can take advantage of this and use the rendering layers of certain document formats (e.g., PDF) to generate for each page a segmentation map (or mask) which specifies the drawing type (e.g., text, vector, or raster) each pixel belongs to.

Figure 4:
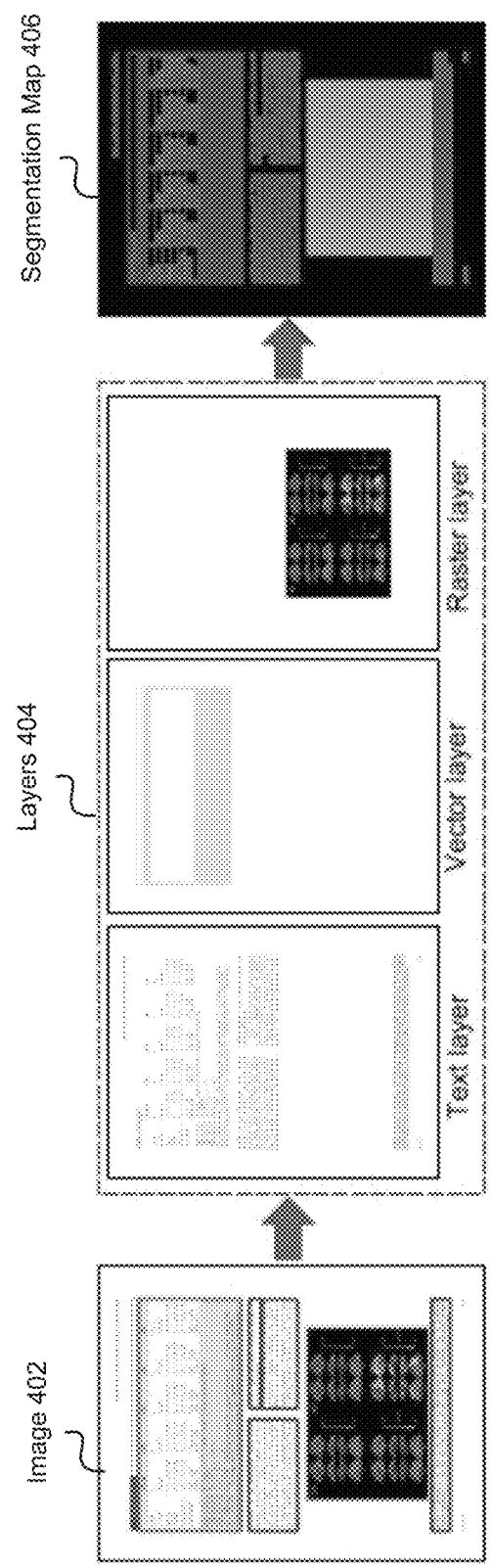
FIG. 4 shows a diagram that illustrates an example process for generating a segmentation map based on an input image.

FIG. 4 illustrates an example process for generating a segmentation map based on an input image. As shown in FIG. 4, an input image 402 can be processed to generate various layers 404 (e.g., text, vector, and raster) which are then binarized to separate the foreground from the background. The input image 402 may be an image in a format such as PDF or may be a result of processing the image such as feature map 212 output by the FPN 202. Next, the binary maps of the multiple layers are merged to generate the dense segmentation map 406. In some embodiments, morphological dilation and close operations can be performed on the merged map to fill in gaps, such as gaps between text characters and/or holes in raster images.

Returning to FIG. 2, the RLA module 208 can include a segmentation neural network that take an input (e.g., feature maps 212) and outputs one or more segmentation maps indicative of a drawing type that each pixel input image (e.g., feature map) belongs to. The segmentation maps output by the segmentation neural network of the RLA module 208 can be used as a ground truth for training the object detection model 200.

In an example embodiment, the objective function, or rendering layer segmentation objective 228, can be represented as follows:

$$\mathcal{L}_s = -\frac{1}{W_m^s H_m^s C}\sum_{i=1}^{W_m^s H_m^s}\sum_{c=1}^{C}y_{i,c}\log p_{i,c}^s - \frac{1}{W_{m'}H_{m'}C}\sum_{i=1}^{W_{m'}H_{m'}}\sum_{c=1}^{C}y_{i,c}\log p_{i,c}^t, \quad (5)$$

where $W_m^s$, $H_m^s$, $W_m^t$, and $H_m^t$ are the width and height of the segmentation maps for the source and target images, respectively; $p_{i,c}^s$ and $p_{i,c}^t$ are the possibility of the i-th pixel of the segmentation map being associated with a particular class c; $y_{i,c}$ is the ground truth label; and C is the number of classes. In some cases, the vector drawing class may not be reliable, since vector drawings are usually too thin to have a concrete semantic meaning. In such cases, the vector class can be merged into a background class, thereby resulting in three classes (i.e., C=3), namely, "background", "text,", and "raster."

As alluded to above, RLA module 208 can be used to bridge certain domain gaps and has limited applicability to certain document formats. Accordingly, the RLA module 208 may only be applied in select embodiments and is not necessary to practice the introduced technique.

3.5 Domain Adaptation Phase Training

One or more of the training objectives described with respect to FIG. 2 can be used to train the object detection model 200 during the domain adaptation phase. For example, in some embodiments, the model is trained end-to-end using an overall objective function. In some embodiments, the overall objective function is an overall loss function. In such embodiments, the model is trained end-to-end by minimizing an overall loss using the overall loss function. In other words, one or more parameters of the object detection model 202 may be adjusted to minimize the overall loss. In some embodiments, the overall objective function is based on a sum of the objective functions associated with one or more of the previously described objectives (see e.g., equations (2)-(5)). In an example embodiment, in which the FPA module 204, the RPA module 206, and the RLA module 208 are applied, the overall objective function can be represented as follows:

$$\mathcal{L} = \mathcal{L}_{det}^s + \lambda_1 \mathcal{L}_p + \lambda_2 \mathcal{L}_r + \lambda_3 \mathcal{L}_s, \quad (6)$$

where $\mathcal{L}_{det}^s$ is the objective function (in this example, loss function) associated with the object detection objective 230; $\mathcal{L}_p$ is the objective function (in this example, loss function) associated with the pixel-level domain alignment objective 224; $\mathcal{L}_r$ is the objective function (in this example, loss function) associated with the instance-level domain alignment objective 226; $\mathcal{L}_s$ is the objective function (in this example, loss function) associated with the segmentation objective 228; and $\lambda_1$, $\lambda_2$ and $\lambda_3$ are hyper-parameters.

As previously mentioned, some embodiments may only use one or two modules selected from the FPA module 204, RPA module 206, and RLA module 208. Accordingly, the overall objective function applied when training the object detection model 200 will differ depending on which objectives are applied. For example, in an embodiment using only the FPA module 204 and RPA module 206, the overall objective function may instead be represented as: $\mathcal{L}' = \mathcal{L}_{det}^s + \lambda_1 \mathcal{L}_p + \lambda_2 \mathcal{L}_r$.

In some embodiments, the inputs to the object detection model 200, during training for domain alignment, will alternate between batches of the labeled source data 102 and batches of the unlabeled target data 104. In other words, a first batch of data from the labeled source dataset 102 may be input to the object detection model 200, followed by a second batch from the unlabeled target dataset 104, followed by a third batch from the labeled source dataset 102, and so on. The batches of data from labeled source data 102 and unlabeled target data 104 will be processed for training the object detection model 200 as part of the domain adaptation phase, as described, for example, with respect to FIG. 2. Notably, when training on a batch of labeled source data 102, the object detection model 200 may use an overall objective function based on a sum of the object detection objective 300 and one or more of the alignment objectives (e.g., the pixel-level domain alignment objective 224, the instance-level domain alignment objective 226, and/or the segmentation objective 228). Conversely, when training on a batch of unlabeled target data 104, the object detection objective 300 is not used since the unlabeled target data 104 does not include any labeled bounding boxes. Instead, when training on the unlabeled target data 104, the object detection model 200 may use an overall objective function based on a sum of one or more of the alignment objectives (e.g., the pixel-level domain alignment objective 224, the instance-level domain alignment objective 226, and/or the segmentation objective 228). Accordingly, the overall objective function applied during training for domain alignment will depend on 1) alignment modules applied, and 2) whether training is being performed on a batch of labeled source data 102 or a batch of unlabeled target data 104.

4. Model Deployment and Inference

Once the domain adaptation phase and any performance testing phases are completed, the object detection model can be deployed for use in a tool for generating inferences based on input images in the source domain and/or target domain. The tool where the object detection model is deployed may include any of a computing device or a piece of software such as an application. For example, the object detection model may be deployed as a module in an application configured for any number of uses such as document editing, document review/analysis, photo editing, graphical artwork editing, data/image retrieval, image analysis, video surveillance, video editing, autonomous vehicle navigation, image-based object tracking, etc.

In some embodiments, the deployed object detection model retains the trained FPN 202 but removes the various domain adaptation modules such the FPA module 204, the RPA module 206, and the RLA module 208. Once deployed, the inference process can proceed as a standard object detection model. That is, an image (e.g., associated with the source and/or target domain) is input into the object detection model which then generates and outputs an object detection inference. In some embodiments this object detection inference may include a class identification (e.g., text, paragraph, table, figure, person, car, etc.) associated with a detected object as well as a bounding box that bounds an instance of the detected object. This object detection inference can then be used by other upstream systems associated with the tool in which the model is deployed to perform various functions associated with tool.

5. Example Processes

FIGS. 5-9 show various flow diagrams that describe example processes associated with various embodiments of the introduced technique. One or more operations of the example processes of FIGS. 5-9 may be performed by any one or more computer systems. In some embodiments, one or more operations of the example processes of FIGS. 5-9 may be performed by a computer system as described with respect to FIG. 12. For example, the processes described with respect to FIGS. 5-9 may be represented in instructions stored in memory that are then executed by a processing unit of a computer system. The processes described with respect to FIGS. 5-9 are examples provided for illustrative purposes and are not to be construed as limiting. Other processes may include more or fewer operations than depicted while remaining within the scope of the present disclosure. Further, the operations associated with the example processes may be performed in a different order than is shown in the flow diagrams of FIGS. 5-9. Certain operations associated with the flow diagrams of FIGS. 5-9 are described with respect to components depicted in FIGS. 1-2.

Figure 5:
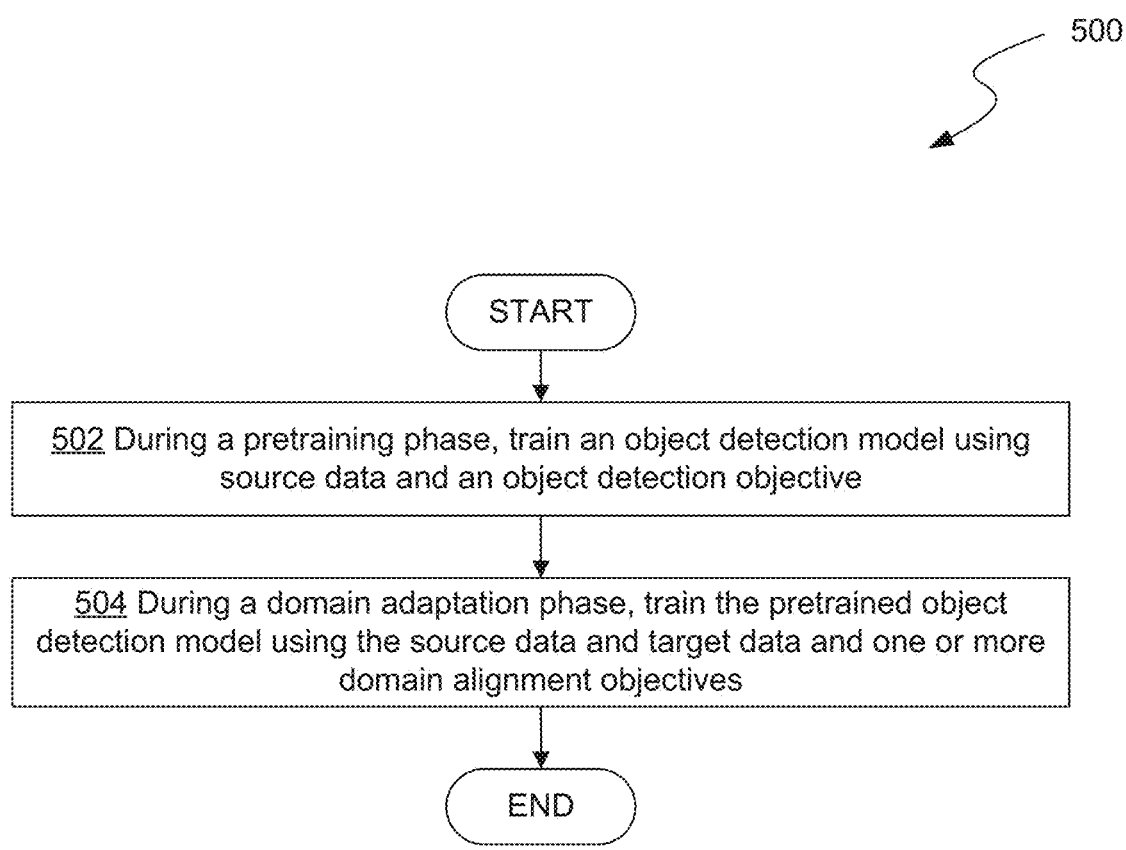
FIG. 5 shows a flow diagram of an example process for training an object detection model for cross-domain object detection.

FIG. 5 shows a flow diagram of an example process 500 for training an object detection model for cross-domain object detection, according to an embodiment of the introduced technique.

Example process 500 begins at operation 502 with performing a pretraining phase by training an object detection model 106 (e.g., that includes an FPN) using labeled source data 102 and an object detection objective 107. In other words, the object detection objective 107 can be used as an objective function for training the object detection model 106 to detect objects in input images. As previously discussed, the labeled source data 102 may include a dataset of images in a source domain that include, or are otherwise associated with, labels or other information indicative of objects in the images. Such labels may represent ground truth information that can be used to train the object detection model 106 to infer detected objects in other images that are not included in the training data set.

After completing the pretraining phase, example process 500 continues at operation 504 with training the pretrained object detection model 106 using the labeled source data 102, unlabeled target data 104, and one or more domain alignment objectives 112. The unlabeled target data 104 may include a dataset of images in a target domain that is different than the source domain. In some embodiments the domain alignment objectives 112 may be used as objective functions to train the object detection model 106 to align various intermediate outputs 108 such as feature maps, feature pyramids, and/or region proposals across the source and target domains.

Figure 6A:
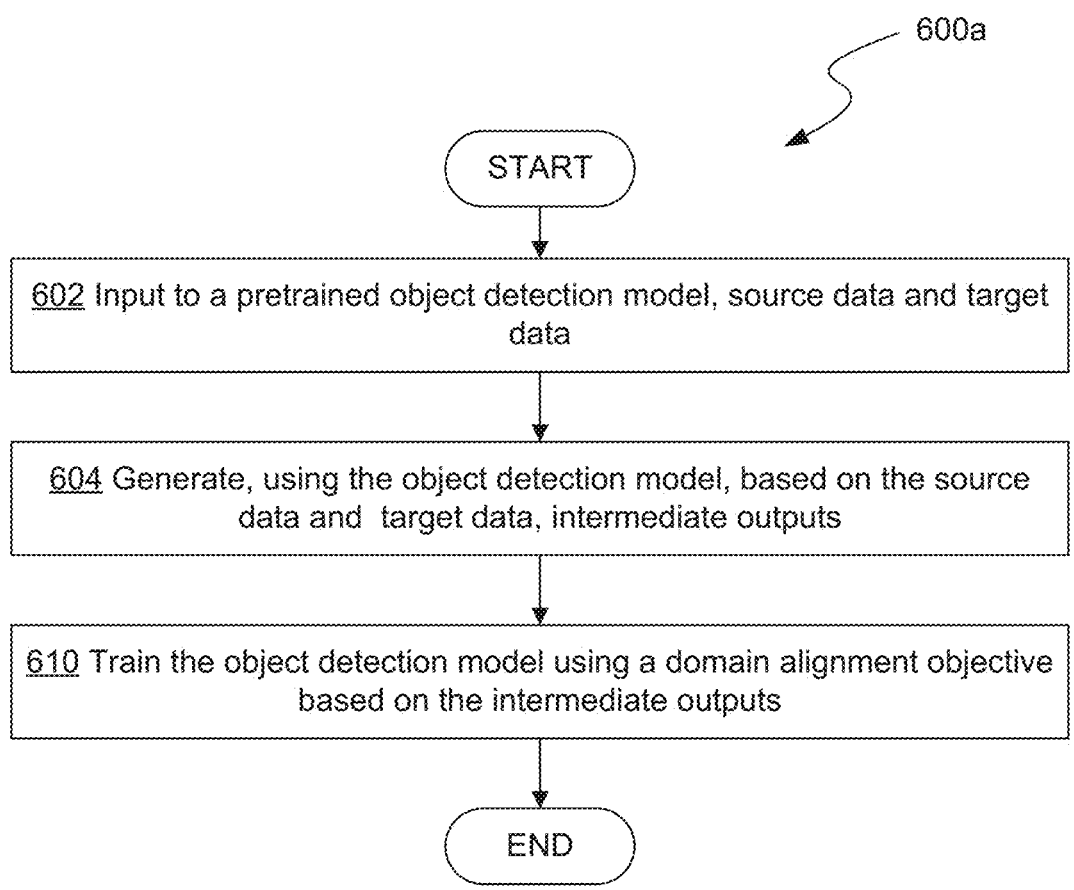
FIG. 6A shows a flow diagram of an example process for adapting an object detection model that is pretrained based on labeled source data to detect objects based on input images in a target domain, according to an embodiment of the introduced technique.

FIG. 6A shows a flow diagram of an example process 600a for adapting an object detection model 106 that is pretrained based on labeled source data for cross-domain object detection based on input images in a target domain, according to an embodiment of the introduced technique. In some embodiments, example process 600a may represent a subprocess of the domain adaptation phase referred to in operation 504 of example process 500. In other words, example process 600a may be performed after pretraining an object detection model using labeled source data and an object detection objective as an objective function.

At operation 602, labeled source data 102 and unlabeled target data 104 are input into the pretrained object detection model. In some embodiments, batches of the labeled source data 102 and unlabeled target data 104 are alternately input into the object detection model 106. In some embodiments, the input batches are disjoint from each other (i.e., do not overlap).

At operation 604, one or more intermediate outputs 108 are generated, using the pretrained object detection model 106, based on the input labeled source data 102 and unlabeled target data 104. The intermediate outputs 108 may include, for example, feature maps output by an FPN associated with the object detection model 106, region proposals output by an RPN associated with the object detection model, and any other types of intermediate outputs.

At operation 610, the object detection model 106 is trained using a domain alignment objective 112 based on the intermediate outputs generated at operation 604. For example, the domain alignment objective 112 may be used as an objective function to train the object detection model 106 to generate or otherwise produce domain-agnostic intermediate outputs 108. In other words, the domain alignment objective 112 may be used as an objective function to train the object detection model 106 to generate or otherwise produce similar intermediate outputs 108 regardless of whether they originate from labeled source data 102 or unlabeled target data 104. In this way, the object detection model 106 is trained to learn feature representations that are not domain-discriminative (i.e., that are domain agnostic), thereby allowing the object detection model 106 to effectively generate inferences based on input images in both the source and target domain.

In some embodiments, the domain alignment objective 112 used at operation 610 may be an instance-level domain alignment objective based on region proposals generated, for example, at operation 608. In other words, operation 610 may include training an object detection model 106, using an instance-level domain alignment objective as an objective function to cause the object detection model 106 to generate or otherwise produce region proposals that are not domain-discriminative (i.e., that are domain agnostic).

In some embodiments, the domain alignment objective 112 used at operation 610 may be a pixel-level domain alignment objective based on feature maps generated, for example, at operation 608. In other words, operation 610 may include training an object detection model 106, using a pixel-level domain alignment objective as an objective function to cause the object detection model 106 to generate or otherwise produce feature maps that are not domain-discriminative (i.e., that are domain agnostic).

In some embodiments, the objective functions applied at operation 610 may differ depending on which batch of data is currently being processed for training. For example, when training on a batch of labeled source data 102, the object detection model 106 may use an overall objective function based on an object detection objective 107 and the domain alignment objective 112. Conversely, when training on a batch of unlabeled target data 104, the object detection objective 107 is not used since the unlabeled target data 104 does not include any labeled bounding boxes. Instead, when training on the unlabeled target data 104, the object detection model 106 may use an overall objective function based on the domain alignment objective 112, but not the object detection objective 107.

Figure 6B:
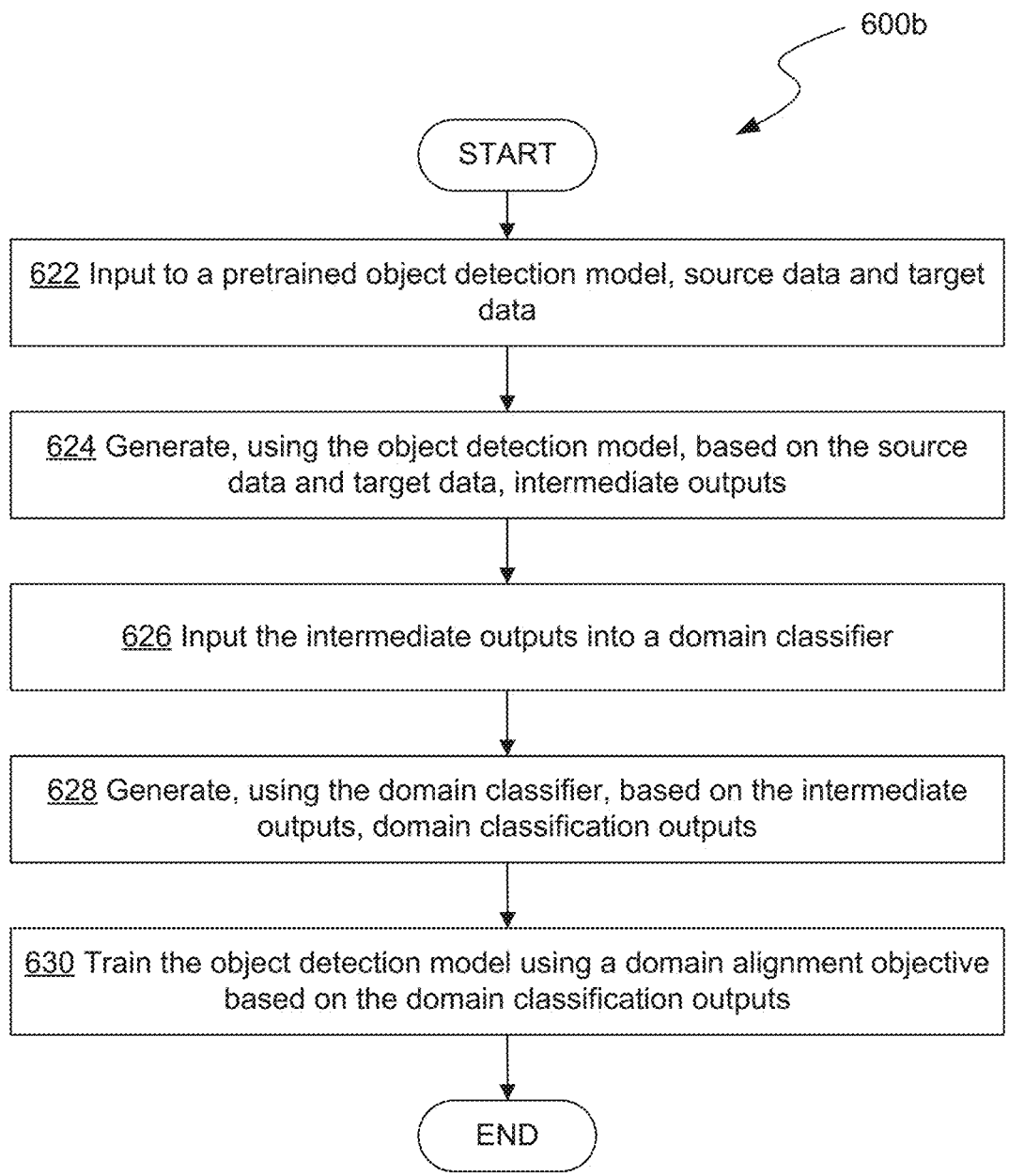
FIG. 6B a flow diagram of an example process for adapting an object detection model that is pretrained based on labeled source data to detect objects based on input images in a target domain, according to another embodiment of the introduced technique.

Model training at operation 610 may be performed using any domain alignment technique. For example, in some embodiments, statistics generated based on the intermediate outputs 108 can be applied as an objective function to train the object detection model 106, for example, as described with respect to FIG. 1. Alternatively, or in addition, domain classifiers can be applied to perform domain alignment when training an object detection model. FIG. 6B shows a flow diagram of another example process 600b for adapting an object detection model 106 for cross-domain object detection using domain classifiers. As with example process 600a, example process 600b may represent a subprocess of the domain adaptation phase referred to in operation 504 of example process 500. In other words, example process 600b may be performed after pretraining an object detection model using labeled source data and an object detection objective as an objective function.

At operation 622, labeled source data 102 and unlabeled target data 104 are input into the pretrained object detection model, for example, as described with respect to operation 602 of example process 600a.

At operation 624, one or more intermediate outputs 108 (e.g., feature maps and/or region proposals) are generated, for example as described with respect to operation 604 of example process 600a.

At operation 626, one or more of the intermediate outputs 108 are input into a domain classifier 110 that is trained to predict or otherwise determine whether a given input is associated with the source domain or target domain. In some embodiments, domain classifier 110 may actually represent multiple different domain classifiers such as the domain classifiers {D1, D2, D3, D4} associated with an FPA module 204 and/or the domain classifier $D_r$ associated with an RPA module 206. In such embodiments, certain intermediate outputs 108 (e.g., feature maps) are input into one domain classifier, while other intermediate outputs 108 (e.g., region proposals) are input into a different domain classifier.

At operation 628, one or more domain classification outputs are generated, using the domain classifier 110, based on the intermediate outputs 108. For example, the domain classifier 110 may be configured as a binary domain classifier to determine whether a given input is associated with the source domain or target domain. Accordingly, the domain classification output generated at operation 628 may be indicative of a binary classification (i.e., associated with a source domain or associated with a target domain). Stated differently, the domain classification output may be indicative of a prediction or determination, by the domain classifier, of whether a given intermediate output (e.g., feature map or region proposal) is associated with the source domain or the target domain. In this context, "associated with the source domain" may mean that a given intermediate output resulted from an input image in the source domain. Similarly, "associated with the target domain" may mean that a given intermediate output resulted from an input image in the target domain. In some embodiments, this binary domain classification output may be represented in a single bit (e.g., 1=source domain, 0=target domain). In other embodiments, the domain classification output for a given input may represent multiple bits of information. For example, a pixel-level domain classification output based on an input feature map may include data indicative of domain classification for each pixel (possibly hundreds to millions of pixels) in given feature map.

At operation 630, the object detection model 106 is trained based on the domain classification outputs generated at operation 628. In some embodiments, operation 610 includes training the object detection model 106 using a domain alignment objective 112 that is based on the domain classification outputs generated at operation 628. For example, the domain alignment objective 112 may be used as an objective function to train the object detection model 106 to generate or otherwise produce domain-agnostic intermediate outputs 108. In other words, the domain alignment objective 112 may be used as an objective function to train the object detection model 106 to generate or otherwise produce intermediate outputs 108 that are difficult for the domain classifier 110 to classify correctly. In this way, the object detection model 106 is trained to learn feature representations that are not domain-discriminative, thereby allowing the object detection model 106 to effectively generate inferences based on input images in both the source and target domain. In some embodiments, the objective functions applied at operation 630 may differ depending on which batch of data is currently being processed for training, for example, as described with respect to operation 610 of example process 600a.

Figure 7:
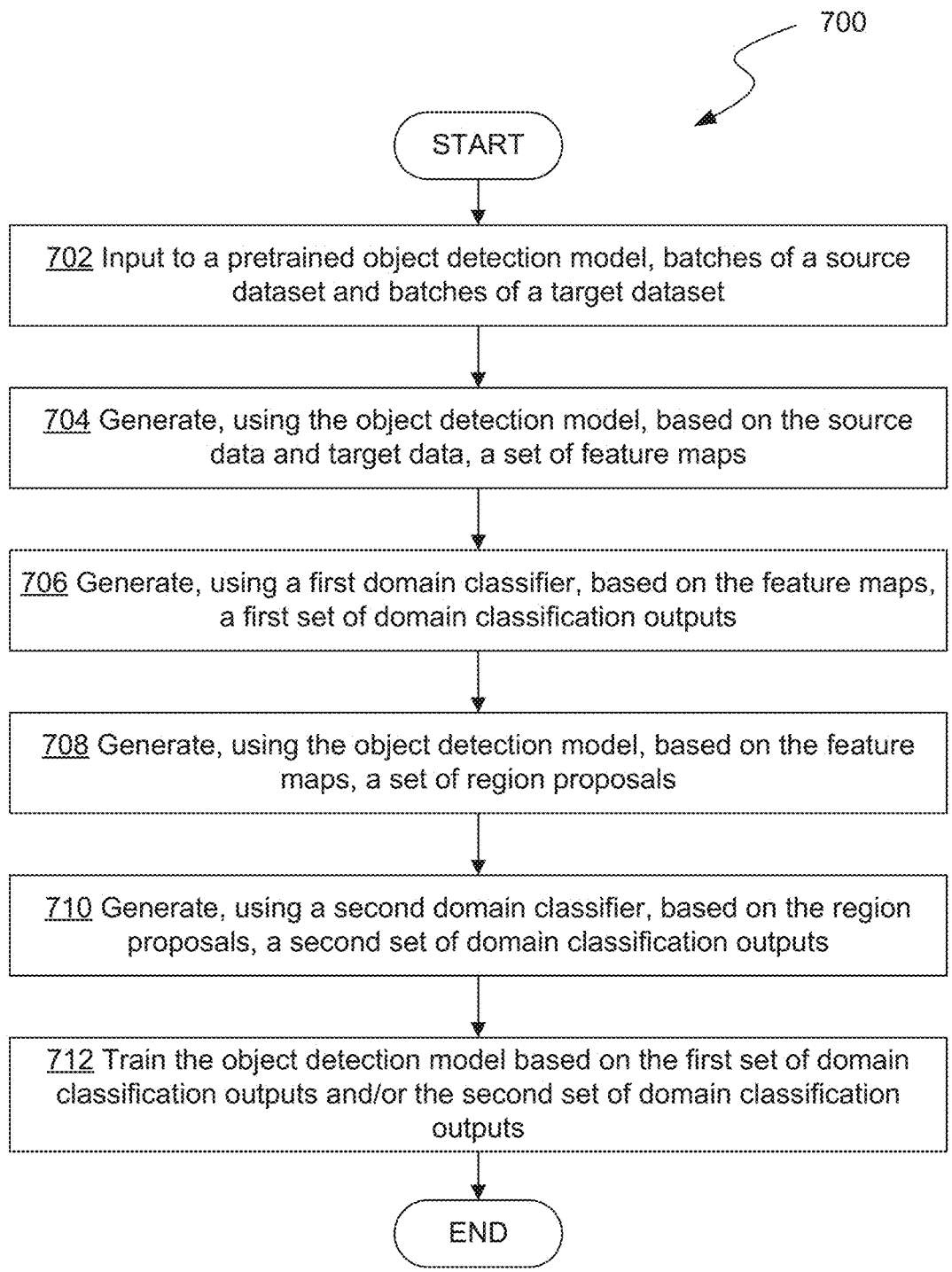
FIG. 7 shows a flow diagram of an example process for adapting an object detection model that is pretrained based on labeled source data to detect objects based on input images in a target domain, according to yet another embodiment of the introduced technique.

FIG. 7 shows a flow diagram of an example process 700 for adapting an object detection model that is pretrained based on labeled source data for cross-domain object detection based on input images in a target domain, according to another embodiment of the introduced technique. As with example process 600, example process 700 may represent a subprocess of the domain adaptation phase referred to in operation 504 of example process 500. In other words, example process 700 may be performed after pretraining an object detection model using labeled source data and an object detection objective as an objective function.

At operation 702, labeled source data 102 and unlabeled target data 104 are input into the pretrained object detection model, for example, as described with respect to operation 602 of example process 600. In some embodiments, operation 702 includes inputting batches of the labeled source data 102 and unlabeled target data 104. In this context, a "batch" refers to a subset of one or more images in a given dataset. For example, a batch of the labeled source data 102 may include a set of one or more images from the dataset of images included in the labeled source data 102. Similarly, a batch of the unlabeled target data may include a set of one or more images from the dataset of images included in the unlabeled target data 104. In some embodiments, the batches of source data 102 and target data 104 are disjoint. In other words, a first batch of source data 102 may not overlap with a second batch of source data 102. In some embodiments, the batches are not disjoint. In other words, a first batch of source data 102 may include images that are common to a second batch of source data 102. In some embodiments, the batches of the labeled source data 102 and unlabeled target data 104 are alternately input into the object detection model 200. In other words, a first batch of data from the labeled source data 102 may be input to the object detection model 200, followed by a second batch of data from the unlabeled target data 104, followed by a third batch of data from the labeled source data 102, and so on.

At operation 704, a set of one or more feature maps is generated, using the object detection model 200, based on the labeled source data 102 and/or unlabeled target data 104 input at operation 702.

In some embodiments, the feature maps generated at operation 704 may represent high-level semantic outputs based on layers of an artificial neural network (e.g., a convolutional neural network (CNN)). In other words, in an example embodiment, a feature map may represent an output of one of the hidden layers of a neural network based on an input that includes an array of pixel data associated with an image. In the context FIG. 2, a feature map may represent an output of a layer of the network backbone 210.

In some embodiments, the object detection model 200 may include a feature detector module such as FPN 202. In such embodiments, the feature maps generated at operation 704 may be part of one or more feature pyramids that are output by the FPN 202, based on the labeled source data 102 and/or unlabeled target data 104 input at operation 702. In other words, in the context of FIG. 2, the feature maps generated at operation 704 may also represent the pyramid feature map outputs {$P_1$, $P_2$, $P_3$, $P_4$} of the FPN 202. In embodiments where an FPN 202 is implemented, the feature maps generated at operation 704 may be at different scales or spatial resolutions, as defined by the configuration of the FPN 202. For example, a first feature map in an output feature pyramid may be at a first spatial resolution, and a second feature map in the output feature pyramid may be at a second spatial resolution that is different than the first spatial resolution.

In any case, the feature maps generated at operation 704 may include sets of feature maps generated based on the labeled source data 102 and unlabeled target data 104. For example, a first image that is part of a first batch of labeled source data 102 may be input into an FPN 202 to produce a first feature pyramid that includes a first set of multiple feature maps at different spatial resolutions. Similarly, a second image that is part of second batch of unlabeled target data 104 may be input into the FPN 202 to produce a second feature pyramid that includes a second set of multiple feature maps at different spatial resolutions.

At operation 706, a first set of one or more domain classification outputs is generated, using a first domain classifier, based on one or more of the feature sets generated at operation 704. In some embodiments, the first domain classifier used at operation 706 may be part of an FPA module such as FPA module 204 described with respect to FIG. 2.

The first domain classifier may be trained to predict or otherwise determine whether a given input (e.g., feature map) is associated with the source domain or target domain. In other words, the first domain classifier may be a binary domain classifier. In such embodiments, a domain classification output generated at operation 706 may be indicative of prediction or determination, by the first domain classifier, of whether an associated input (e.g., feature map) is associated with the source domain or target domain. In this context, "associated with the source domain" may mean that the feature map (or a subset of the feature map) resulted from an input image in the source domain. Similarly, "associated with the target domain" may mean that the feature map (or a subset of the feature map) resulted from an input image in the target domain.

In some embodiments, the first domain classifier may be a pixel-level domain classifier. In such embodiments, a domain classification output generated at operation 706 may be indicative of a prediction or determination, by the first domain classifier, of whether a given pixel or set of pixels in a given input (e.g., feature map) is associated with the source domain or target domain. In such embodiments, a domain classification output based on a feature map may include multiple values indicative of a prediction or determination of whether each of the multiple pixels of the feature map are associated with the source domain or target domain.

In some embodiments, this domain classification output at operation 706 may be represented in a single bit (e.g., 1=source domain, 0=target domain). In other embodiments, the domain classification output at operation 706 may represent multiple bits of information. For example, a pixel-level domain classification output based on an input feature map may include multiple bits were each bit is indicative of a prediction or determination of whether a given pixel in a given feature map is associated with the source domain or target domain.

In some embodiments, the first domain classifier may include multiple domain classifiers. For example, where the feature maps input at operation 704 are part of a multi-layer feature pyramid, each of the multiple domain classifiers of the first domain classifier may be specifically trained to generate domain classification outputs based on a different layer of the feature pyramid. The example FPA module 204 described with respect to FIG. 2 includes four domain classifiers {D1, D2, D3, D4}, each trained to generate domain classification outputs based on a different one of four layers in a feature pyramid output by the FPN 202. As previously discussed, an FPN may be configured to output a feature pyramid with more or fewer than four layers. Accordingly, the first domain classifier may include more or fewer than four resolution-specific domain classifiers.

In some embodiments, each of the multiple domain classifiers of the first domain classifier may be referred to as a resolution-specific domain classifier. For example, the first domain classifier used at operation 706 may include at least a first resolution-specific domain classifier trained to generate domain predictions or determinations based on feature maps of a first spatial resolution and a second resolution-specific domain classifier trained to generate domain predictions or determinations based on feature maps of a second spatial resolution that is different than the first spatial resolution. Accordingly, in some embodiments, operation 706 may include 1) generating, using a first resolution-specific domain classifier, based on a first feature map, a first particular domain classification output indicative of a prediction or determination of whether a given pixel in the first feature map is associated with the source domain or the target domain, and 2) generating, using the second resolution-specific domain classifier, based on a second feature map, a second particular domain classification output indicative of a prediction or determination of whether a given pixel in the second feature map is associated with the source domain or the target domain.

At operation 708, a set of one or more region proposals is generated, using the object detection model 200, based on one or more of the feature maps generated at operation 704. In some embodiments, the object detection model 200 includes an RPN 216, for example, as described with respect to FIG. 2. In such embodiments, the one or more region proposals generated at operation 708 may be output by the RPN 216 based on inputs (e.g., a feature pyramid and/or individual feature maps) received from the FPN 202.

At operation 710, a second set of one or more domain classification outputs is generated, using a second domain classifier, based on one or more of the feature sets generated at operation 704. In some embodiments, the second domain classifier used at operation 710 may be part of an RPA module such as RPA module 206 described with respect to FIG. 2. For example, the second domain classifier used at operation 206 may correspond to domain classifier $D_r$ described with respect to FIG. 2.

The second domain classifier may be trained to predict or otherwise determine whether a given input (i.e., a region proposal) is associated with the source domain or target domain. In other words, like the first domain classifier applied at operation 706, the second domain classifier may be a binary domain classifier. In such embodiments, a domain classification output generated at operation 710 may be indicative of prediction or determination, by the second domain classifier, of whether an associated input (i.e., region proposal) is associated with the source domain or target domain. In this context, "associated with the source domain" may mean that the region proposal ultimately resulted from an input image in the source domain. Similarly, "associated with the target domain" may mean that the region proposal ultimately resulted from an input image in the target domain.

At operation 712, the object detection model 200 is trained based on one or more of the first set of domain classification outputs generated at operation 706 and/or one or more of the second set of domain classification outputs generated at operation 710.

In some embodiments, operation 712 may include training the object detection model 200 using domain alignment objectives that are based on the first and/or second sets of domain classification outputs. In such embodiments, a first domain alignment objective may include a pixel-level domain alignment objective 224 based on one or more of the first set of domain classification outputs, for example, as described with respect to FIG. 2. Similarly, a second domain alignment objective may include an instance-level (also referred to as a region-level) domain alignment objective 226 based on the one or more of the second set of domain classification outputs, for example, as described with respect to FIG. 2.

In some embodiments, training the object detection model 200 at operation 712 may include adjusting one or more parameters of the object detection model 200 to reduce an overall accuracy of the first domain classifier and/or the second domain classifier. This can include using the first and/or second domain alignment objectives as objective functions to train one or more components of the object detection model 200 (e.g., FPN 202 and/or RPN 216) to produce domain-agnostic intermediate outputs (e.g., feature maps and/or region proposals). In other words, the first and/or second domain alignment objectives can be used as objective functions to train one or more components of the object detection model 200 (e.g., FPN 202 and/or RPN 216) to produce intermediate outputs (e.g., feature maps and/or region proposals) that are difficult for a domain classifier to classify correctly. For example, equation (3) represents a first example objective function associated with a first domain alignment objective (i.e., a pixel-level domain alignment objective) and equation (4) represents a second example loss function associated with a second domain alignment objective (i.e., an instance-level domain alignment objective). In other words, the object detection model 200 may be trained at operation 712 to fool the first and/or second domain classifiers. In this way, the object detection model 200 is trained to learn feature representations and/or region proposals that are not domain-discriminative (i.e., domain-agnostic), thereby allowing the object detection model 200 to effectively generate inferences based on input images in both the source and target domain.

In some embodiments, training the object detection model 200 at operation 712 may include adjusting one or more parameters of the object detection model 200 to minimize or otherwise reduce a value of an overall loss function based on a first loss function associated with the first (pixel-level) domain alignment objective and/or a second loss function associated with the second (instance-level) domain alignment objective. The one or more parameters of the object detection model 200 that are adjusted as part of the training performed at operation 712 may include parameters of various components of the object detection model 200 including, for example, parameters of an FPN 202 and/or an RPN 216. In embodiments where both the first and second domain alignment objectives are used, operation 712 may include adjusting one or more parameters of the object detection model 200 to minimize or otherwise reduce a value of an overall loss function that is based on a sum of at least a first loss function associated with the first (pixel-level) domain alignment objective and a second loss function associated with the second (instance-level) domain alignment objective.

In some embodiments, the overall loss function applied at operation 712 may differ depending on which batch of data is currently being processed for training. For example, when training on a batch of labeled source data 102, the object detection model 200 may use an overall loss function based on an object detection objective 230 and one or both of the pixel-level domain alignment objective 224 and instance-level domain alignment objective 226. Conversely, when training on a batch of unlabeled target data 104, the object detection objective 230 is not used since the unlabeled target data 104 does not include any labeled bounding boxes. Instead, when training on the unlabeled target data 104, the object detection model 200 may use an overall loss function based on one or both of the pixel-level domain alignment objective 224 and instance-level domain alignment objective 226, but not the object detection objective 230. Accordingly, in some embodiments, training the object detection model 200 at operation 712 may include, for a batch of the source data 102, training the object detection model 200 based on a first overall loss function that is based on a sum of at least an object detection objective, the first (pixel-level) domain alignment objective, and the second (instance-level) domain alignment objective. Conversely, training the object detection model 200 at operation 712 may include, for a batch of the target data 104, training the object detection model 200 based on a second overall objective function that is based on a sum of at least the first (pixel-level) domain alignment objective and the second (instance-level) domain alignment objective, but not an object detection objective.

The example process 700 described with respect to FIG. 7 applies domain classifiers to perform domain alignment; however, this is not to be construed as limiting. Other domain alignment techniques (e.g., statistics-based domain alignment) can similarly be applied to perform pixel-level and/or instance-level domain alignment without the use of domain classifiers. For example, in an alternative embodiment that uses an alternative domain alignment technique, example process 700 may not include operations 706 and/or 710. In such an embodiment, the object detection model 712 is trained at operation 712 based, for example, on the feature maps generated at operation 704 and/or the region proposals generated at operation 708.

Further, the example process 700 described with respect to FIG. 7 applies both pixel-level and instance-level domain alignment to adapt a model for cross-domain object detection. In other words, example process 700 may be implemented by applying the functionality of both the FPA model 204 and RPA module 206 described with respect to FIG. 2. However, this example process is not to be construed as limiting. As described with respect to FIG. 2, in some embodiments, the FPA model 204 and RPA module 206 can be applied independently. Accordingly, in an embodiment in which the FPA module 204 is applied but the RPA module 206 is not, example process 700 may forgo operations 708 and 710, meaning that operation 712 may include training the object detection model 712 based on feature sets and/or the first set of domain classification outputs. Conversely, in an embodiment in which the RPA module 206 is applied but the FPA module 204 is not, example process 700 may forgo operation 706 meaning that operation 712 may include training the object detection model 712 based on the region proposals and/or the second set of domain classification outputs.

In some embodiments, additional domain alignment modules can be applied. For example, in embodiments involving an object detection model tasked with detecting objects in documents with layer information such as PDFs, an RLA module 208 can be applied, as described with respect to FIG. 2. In such embodiments, example process 700 may additionally include generating a dense segmentation map, using a segmentation network, based on an input image. The images input into the segmentation network of the RLA module 208 may include images included in the source data 102 and/or target data 104. Alternatively, or in addition, the images input into the segmentation network of the RLA module 208 may include feature maps generated at operation 706. The dense segmentation map output by the segmentation network of the RLA module 208 may include information indicative of predicted or determined drawing type (e.g., text, vector, raster, etc.) that each pixel in the input image belongs to.

The object detection model 200 is then additionally trained at operation 712 based on the dense segmentation map output by the segmentation network of the RLA module 208. For example, the object detection model 200 can be additionally trained using a rendering layer segmentation objective 228 based on one or more dense segmentation maps. As with the pixel-level domain alignment objective 224 and instance-level domain alignment objective 226, the rendering layer segmentation objective 228 is associated with an objective function. For example, equation (5) represents an example loss function associated with a rendering layer segmentation objective 228. In embodiments where the rendering layer segmentation objective 228 is applied in addition to the pixel-level domain alignment objective 224 and instance-level domain alignment objective 226, training the object detection model 200 at operation 712 may include adjusting one or more parameters of the object detection model 200 to minimize or otherwise reduce a value of an overall objective function based on a sum of the respective objective functions associated with each of these domain alignment objectives. For example, equation (6) represents an overall objective function based on a sum of the objective functions associated with a pixel-level domain alignment objective 224, an instance-level domain alignment objective 226, a rendering layer segmentation objective, and an object detection objective 230. Again, the object detection objective 230 will not be applied when training on batches of unlabeled target data 104.

In some embodiments, the domain classifiers are trained along with the object detection model. For example, process 700 may additionally include the operations for training the first domain classifier based on the first set of domain classification outputs and/or training the second domain classifier based on the second set of domain classification outputs. In other words, a first domain classifier (e.g., that is part of FPA module 204) may be trained to effectively distinguish between inputs (e.g., feature maps) associated with the source domain and inputs associated with the target domain using the pixel-level domain alignment objective 224. Similarly, a second domain classifier (e.g., that is part of the RPA 206) may be trained to effectively distinguish between inputs (e.g., region proposals) associated with the source domain and inputs associated with the target domain using the instance-level domain alignment objective 226. In this senses, domain classifiers are trained in an adversarial manner with the object detection model 200. In other words, the domain classifiers are trained to effectively predict or otherwise determine the domain of an input, while the object detection model 200 is trained to produce domain-agnostic intermediate outputs (e.g., feature maps or region proposals) to fool the domain classifiers. In some embodiments, adversarial training of the first domain classier (e.g., domain classifiers {D1, D2, D3, D4}) and/or the second domain classifier (e.g., domain classifier $D_r$) is performed in each individual back-propagation during the end-to-end training of the object detection model 200 at operation 712.

Figure 8:
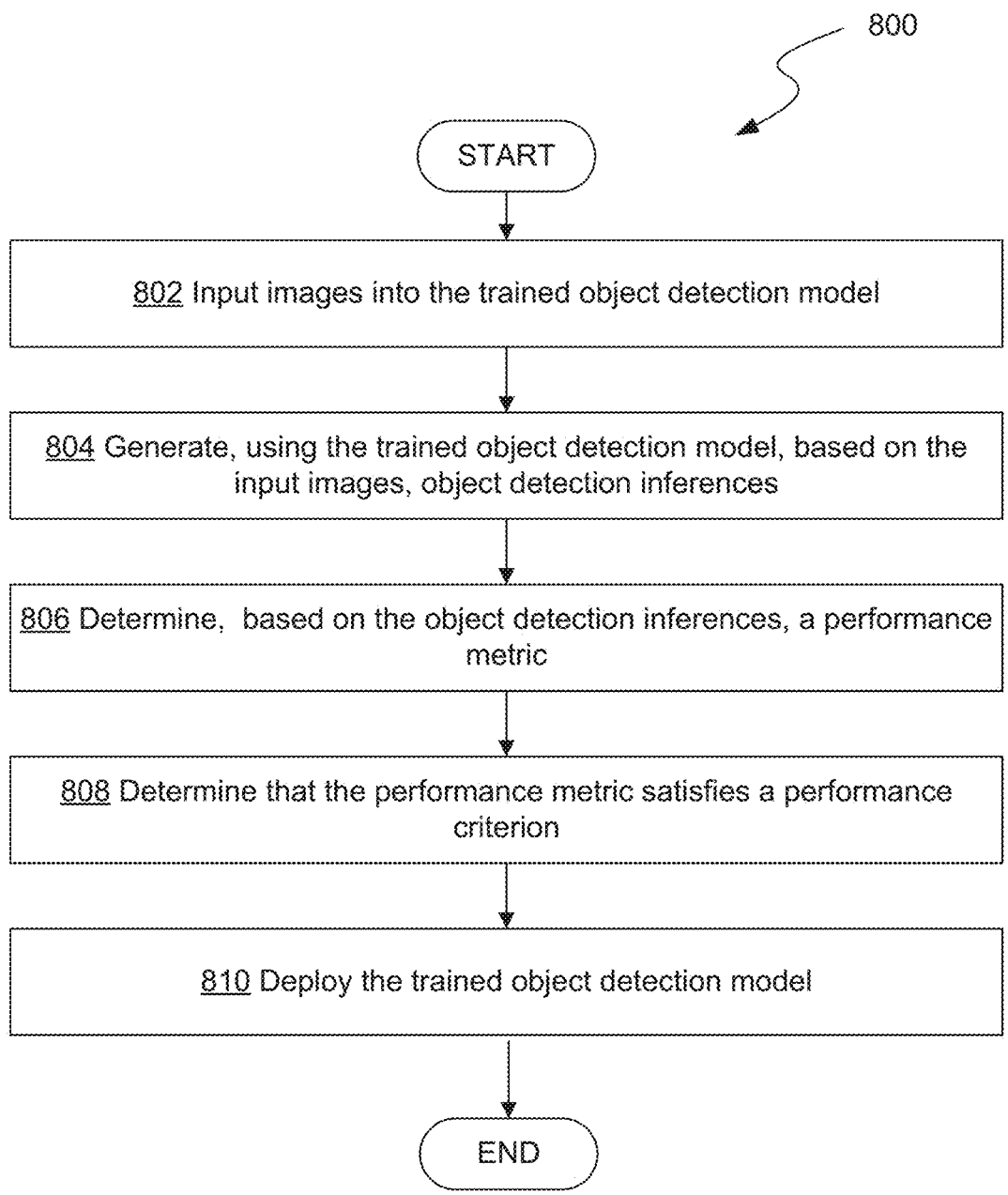
FIG. 8 shows a flow diagram of an example process for evaluating an object detection model that has been adapted for cross-domain object detection.

Once the domain adaptation phase is complete, the trained object detection model can be evaluated to confirm that the model satisfies some performance criterion. FIG. 8 shows a flow diagram of an example process 800 for evaluating an object detection model that has been adapted for cross-domain object detection.

At operation 802, one or more images are input into an object detection model that has been trained, for example, based on process 600 or 700. The images input into the object detection model may include images in the source and/or target domain that were not included in the source data 102 and/or target data 104 used to train the object detection model.

At operation 804, object detection inferences are generated using the object detection model based on the images input at operation 802. Object detection inferences may include, for example, bounding boxes, object classifications, etc.

At operation 806, one or more performance metrics are determined based on the object detection inferences generated at operation 804. Performance metrics may include, for example, accuracy or precision of detection of various classes of objects (e.g., text, list, heading, figure, table, etc.), mean average precision of the precision or accuracy of detection across various classes of objects, or any other suitable performance metrics. Performance metrics may be generated by comparing object detection inferences to ground truth information (e.g., included labels) associated with the images input at operation 802.

At operation 806, it is determined whether the one or more performance metrics determined at operation 804 satisfy one or more performance criteria. In some embodiments, performance criteria may specify threshold values or value ranges for the one or more performance metrics. For example, a performance criterion based on model accuracy may be satisfied if the accuracy determined at operation 806 meets or exceeds a threshold accuracy. The one or more performance criteria may be set based on user inputs and/or may be automatically set based on various factors such as image type, document type, domain type, etc.

At operation 808, the trained object detection model is deployed in response to determining, at operation 810, that the relevant performance criteria are satisfied. The trained object detection model can be deployed for use in an image processing tool to perform object detection tasks. The image processing tool may include, for example, an application, a computing device, a cloud-based service, etc. For example, in the case of an application, deploying the object detection model may include installing, integrating, or otherwise adding the trained object detection model as a module within the application. For example, a document application such as Adobe Acrobat™ may be configured to include an instance of the trained object detection model. In the case of a computing device, deploying the object detection model may include installing, integrating, or otherwise adding the trained object detection model as a module within the computing device. For example, the trained object detection model may be stored in a non-transitory, computer-readable medium of the computing device where the model may be accessible to various applications and/or other software to perform object detection tasks. In the case of a cloud-based service, deploying the object detection model may include installing, integrating, or otherwise adding the trained object detection model as a module at a server (i.e., computing device) associated with the cloud-based service. The functionality of the trained object detection model may then be accessed, via a computer network, by various remote users or subscribers to the cloud-based service. For example, a computing device of a remote user or subscriber may communicate, via a computer network, with a server associated with the cloud-based service to access the functionality of the object detection model. In such an example, the computing device of a remote user or subscriber may upload, via a computer network, an image to the server. Next, the server may process the image using the trained object detection model to generate an object detection inference. Finally, the server may transmit, via the computer network, information indicative of the object detection inference back to the computing device associated with the remote user or subscriber.

Figure 9:
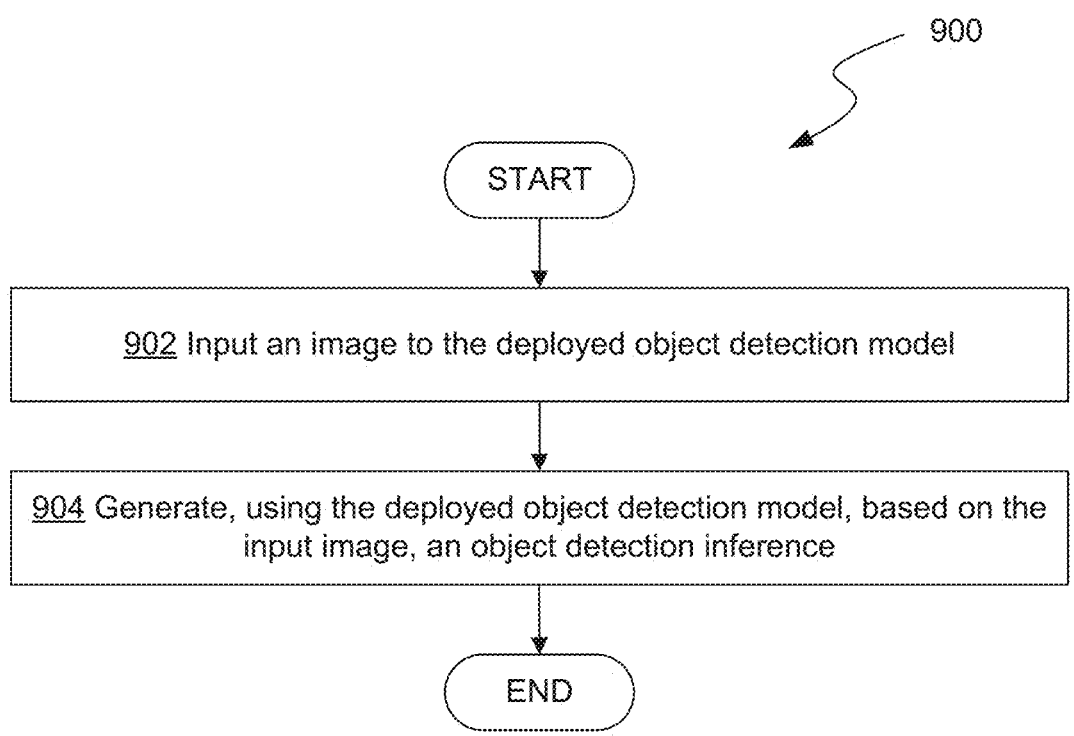
FIG. 9 shows a flow diagram of an example process for generating an object detection inference using an object detection model adapted for cross-domain object detection.

In some embodiments, multiple versions (i.e., snapshots) of the object detection model are generated over successive iterations of training the object detection model at operation 804. In other words, a different version of the object detection model (with different parameters) may be generated based on each training iteration. In such embodiments, operations 804 and/or 806 may be performed multiple times, for example, once for each distinct version of the object detection model. In some embodiments, a particular version of the object detection model is selected from the multiple versions of the object detection model for deployment. The selected version may be the version that performs better than all the other versions of the model. In some embodiment, this selected version may not necessarily be the version that has trained the most (i.e., the most recent snapshot). Once deployed, the trained object detection model can be used to generate object detection inferences based on input images. FIG. 9 shows a flow diagram of an example process 900 for generating object detection inferences.

At operation 902, an image is input into the trained and deployed object detection model. Since the object detection model has been adapted for cross-domain object detection, the image input at operation 902 may be in the source domain, the target domain, or another domain.

At operation 904, the image is processed, using the object detection model, to generate an object detection inference indicative of an object detected in the image. In the case of an image of a document, the detected object may include a letter, a word, a sentence, a paragraph, a figure, a title, a table, etc. In the case of digital images of natural scenes, the detected object may include a physical object such as a person, an animal, a vehicle such as a car, a building, a plant such as a tree, etc. In some embodiments, the object detection inference generated at operation 904 may include a bounding box that surrounds a region of the image in which the detected object resides, an object classification (e.g., figure), and/or a metric associated with the inference such as a confidence level.

Figure 11:
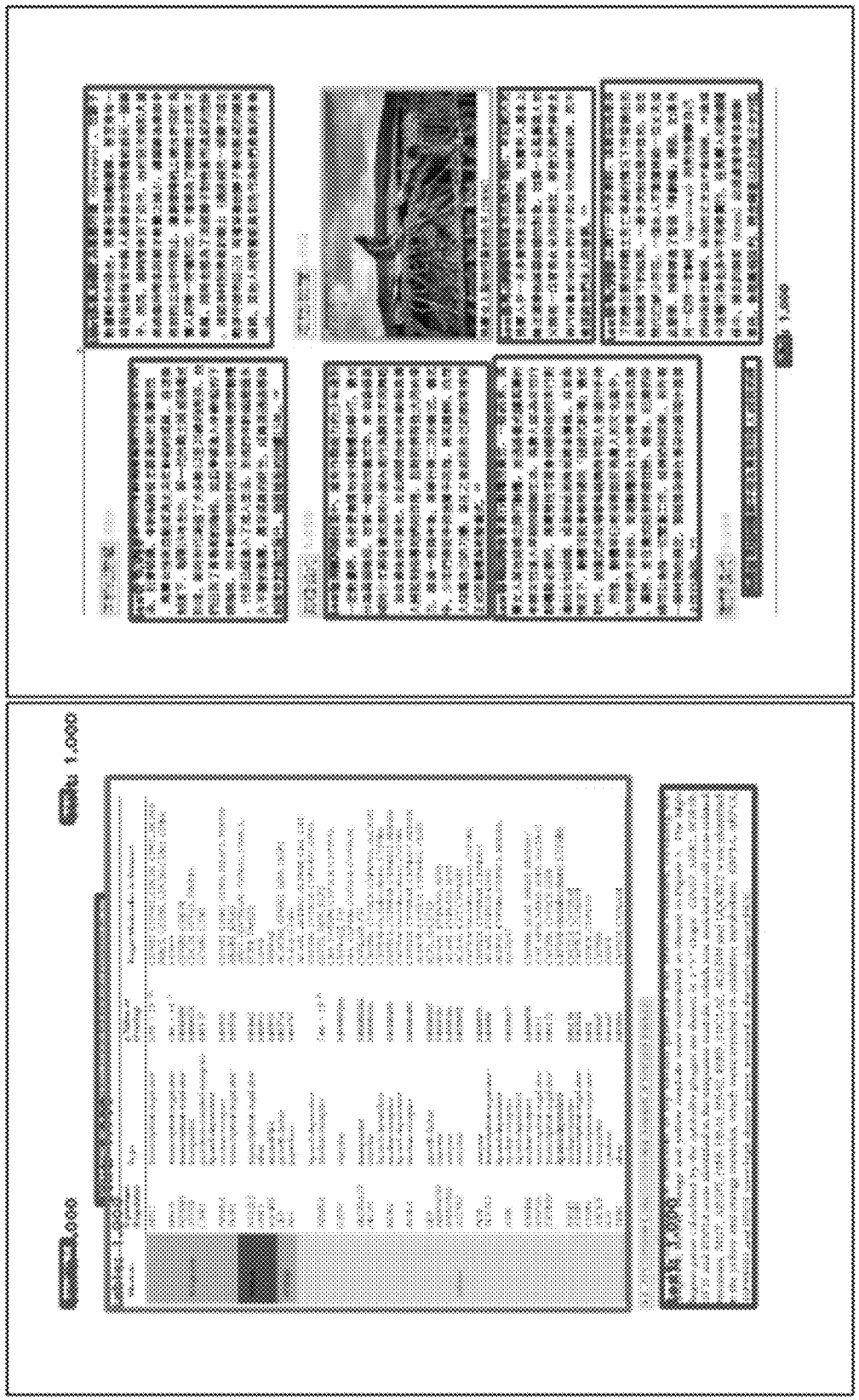
FIG. 11 shows an example visualization based on object detection inferences made using an embodiment of the introduced technique.

The object detection inference generated at operation 904 can be used for various tasks such as document editing, document review/analysis, photo editing, graphical artwork editing, data/image retrieval, image analysis, video surveillance, automated vehicle navigation, etc. Depending on the use, the object detection inference generated at operation 904 may be communicated to a separate module of an image processing tool where the object detection model is deployed. For example, information indicative of the object detection inference may be output to a visualization model to generate a visualization (e.g., a bounding box overlay) associated with the detected object. FIG. 11 shows an example visualization that includes bounding boxes around detected objects.

6. Experiments

Experiments were performed to demonstrate the need for domain alignment in machine-learning-based object detection and to demonstrate the performance advantage of the introduced technique over existing approaches.

6.1 Datasets

The experiments described below used one or more of the following datasets:

Disjoint subsets of PDFCorpus: PDFCorpus is a dataset that includes approximately 1 million collected and labeled PDF pages. Each document page is rasterized as an image and has labeled bounding boxes and an overall page class. The disjoint subsets of PDFCorpus include multiple class-specific datasets (i.e., data sets including documents in one class), namely, Legal, Financial, Manual, Menu, Invoice, and Marketing.

PubMed dataset: A subset of the public PubLayNet dataset which includes labeled academic papers. PubMed includes 12871 images and 257830 bounding box labels. Labeled objects in the documents cover multiple classes including: "text," "heading," "list," "table," and "figure."

Figure 10:
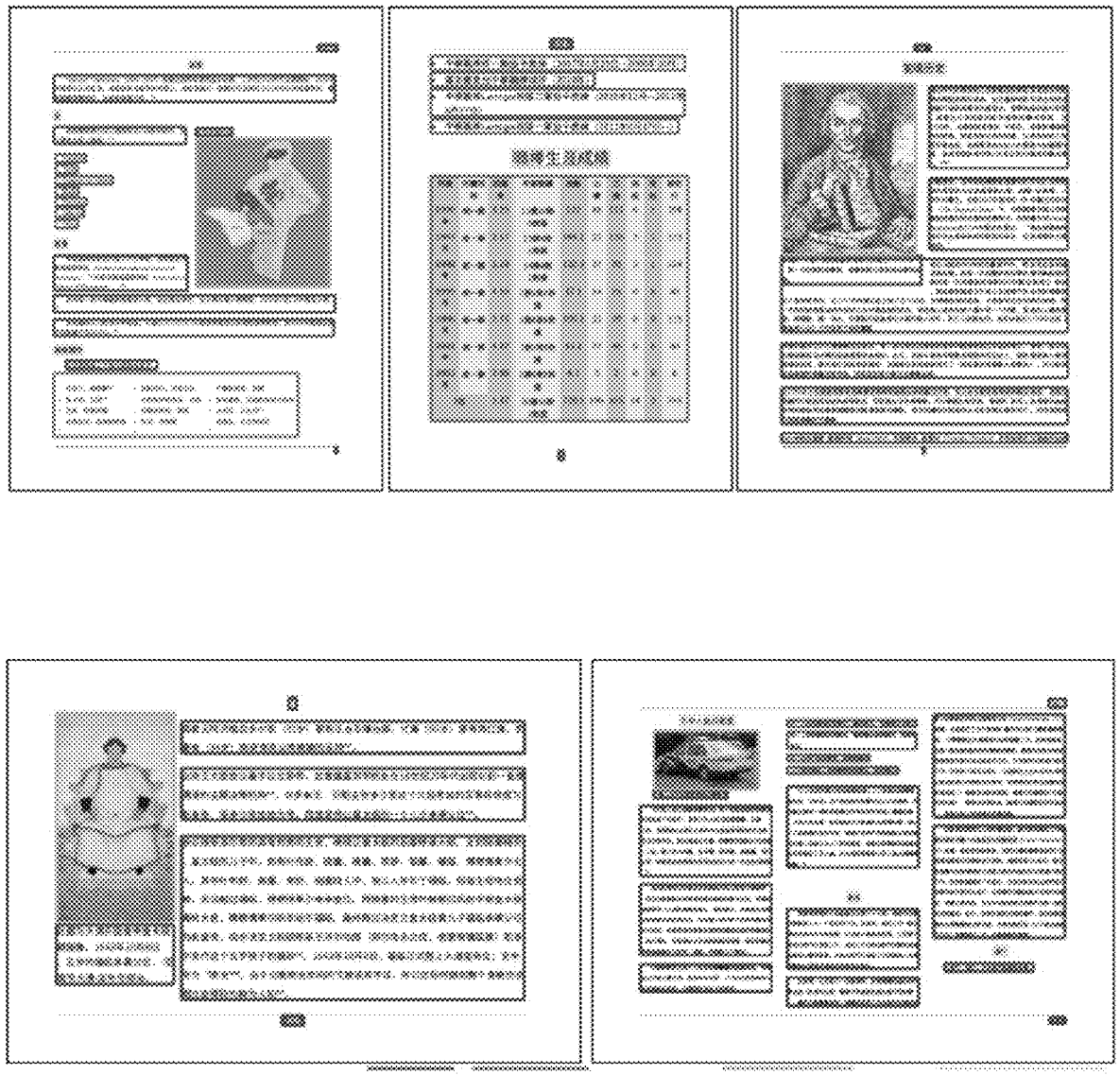
FIG. 10 shows some samples from a dataset of document images used to evaluate an embodiment of the introduced technique.

Chn dataset: The Chn dataset includes synthetic documents in Chinese that were created by filling synthesized layouts with content extracted from Chinese Wikipedia™. Labeled objects in the documents cover the same classes as PubMed. FIG. 10 shows some samples from the Chn dataset with colored bounding boxes as the ground truth labels. The ground truth boxes are color-coded based on object classes (e.g., red=list, magenta=table, blue=text, cyan=figure, and yellow=heading).

Public Computer Vision Benchmarks: Various publicly available datasets for computer vision benchmarks, namely, Cityscape, Foggy Cityscape, Kitti, Sim10K, PASCAL VOC, and apart.

6.2 Cross-Domain Performance without Domain Adaptation

To demonstrate the need for domain adaptation in a machine learning model, six different object detection models were trained, each of the models trained using a different one of the subsets of PDFCorpus, namely, Legal, Financial, Manual, Menu, Invoice, and Marketing. Table 1 below shows the mean average precision (mAP) over six different object classes: "text," "heading," "list," "table," and "figure." Each column in Table 1 corresponds to the model trained on the dataset shown in the first row. Each row represents the test data. For example, the value 41.8 in row=Legal, column=Menu is the mAP that a model trained on the Menu dataset achieves when tested on documents from the Legal dataset. As illustrated in Table 1, in general, models trained on documents in one domain perform poorly on documents in other domains.

TABLE 1

Model performance (mAP) without domain adaptation. Best results in bold.

|  | Manual | Marketing | Legal | Financial | Menu | Invoice |
| --- | --- | --- | --- | --- | --- | --- |
| Manual | 53.5 | 46.6 | 44.3 | 44.5 | 43.3 | 46.5 |
| Marketing | 53.5 | 59.1 | 52.6 | 53.7 | 51.4 | 53.7 |
| Legal | 43.9 | 44.4 | 71.2 | 64.2* | 41.8 | 64.9 |
| Financial | 34.4 | 35.3 | 54.8* | 66.9 | 33.2 | 57.3 |
| Menu | 43.9 | 42.5 | 41.1 | 42.0 | 49.2 | 41.6 |
| Invoice | 47.7 | 47.7 | 62.5 | 64.3 | 43.4 | 73.8 |

Domain adaptation tests were then conducted using the Legal and Financial datasets where the baseline (i.e., no domain adaptation) value is indicated with the * in Table 1 above. When using Legal as the source dataset and Financial as the target dataset, the mAP increased from 54.8* to 65.6 (an approximately 20% error reduction). Conversely, when using Financial as the source dataset and Legal as the target dataset, the mAP increased from 64.2* to 75.9 (an approximately 25% error reduction).

6.3 Ablation Study of FPA, RPA, and RLA Modules

As previously discussed, the introduced technique can include the user of one or more modules for domain adaptation. The example process described with respect to FIG. 2 includes the use of an FPA module 204, an RPA module 206, and an RLA module 208. An ablation study was conducted to evaluate the effectiveness of these modules for domain adaptation from Legal to PubMed. Table 2 below shows the precision values for detection of objects in classes "text," "heading," "list," "table," and "figure," as well as the mAP across classes when using Legal as the source dataset and PubMed as the target dataset. The first row shows the results when only training the FPN 202 on the source dataset (i.e., no domain adaptation). The second row shows the precision results when applying only the FPA module 204 for domain alignment, the third row shows the precision results when applying the FPA module 204 and the RPA module 206 for domain alignment, and the fourth row shows the precision results when applying the FPA module 204, the RPA module 206, and the RLA module 208 for domain alignment.

TABLE 2

Ablation study on use of the FPA, RPA, and RLA modules. Best results in bold.

|  | text | list | heading | table | FIG. | mAP |
|---|---|---|---|---|---|---|
| FPN (source-only) | 60.9 | 51.5 | 74.6 | 69.6 | 67.8 | 64.9 |
| FPN + FPA | 68.4 | 51.9 | 83.4 | 68.1 | 60.5 | 66.5 |
| FPN + FPA + RPA | 65.8 | 52.5 | 82.3 | 74.8 | 67.4 | 68.6 |
| FPN + FPA + RPA + RLA | 67.5 | 53.6 | 82.1 | 76.6 | 73.9 | 70.7 |

In some embodiments, the FPA module 204 can perform domain alignment by pushing the feature pyramids of images from different domains closer together. Since each layer of the feature pyramids incorporate both low-level and high-level features, the FPA can jointly align low-level and high-level semantics. As shown in Table 2, in this study, addition of the FPA module 204 increased the mAP by 1.6 relative to the FPN 202 baseline.

In some embodiments, the RPA module 206 can enhance the alignment of foreground regions by aligning extracted region proposals. As shown in Table 2, in this study, addition of the RPA module 206 further increased the mAP from 66.5 to 68.6.

In some embodiments, the RLA module 208 takes the rendering layers available in both source and target domains as additional alignment cues and trains the network with an auxiliary segmentation task. As shown in Table 2, in this study, addition of the RLA module 208 further increased the mAP from 68.6 to 70.6.

The results shown above in Table 2 demonstrate that the use of less than all three modules for domain alignment can increase model performance as compared to no domain alignment (e.g., training the FPN 202 on source data only). Further, additional performance benefits can be obtained by using more than one of the three modules. That being said, the results shown in Table 2 are provided for illustrative purposes and are not to be construed as limiting or representative of the results in all embodiments or scenarios. For example, as previously discussed, use of the RLA module 208 may be more performative when applied to DOD for documents that have embedded layer information (e.g., PDFs). Models trained to detect objects in other types of images that do not include layer information (e.g., digital photographs of natural scenes) may not significantly benefit from use of the RLA module 208.

6.4 Cross-Domain Comparative Results

Cross-domain performance evaluation was conducted between three datasets, namely Chn, Legal, and PubMed. The Legal and PubMed datasets include documents in English while the Chn dataset includes documents in Chinese, therefore representing a domain gap based on language. The Legal and PubMed datasets are both in English; however, they include different types of documents (i.e., legal vs. medical), therefore representing a domain gap based on document type or industry.

Tables 3, 4, and 5 below show the precision values for detection of objects in classes "text," "heading," "list," "table," and "figure," as well as the mAP across classes when using different combinations of datasets for the source and target. Specifically, Table 3 shows the results with Legal as the source dataset and Chn as the target dataset, and vice versa; Table 4 shows the results with Chn as the source dataset and PubMed as the target dataset, and vice versa; and Table 5 shows the results with Legal as the source dataset and PubMed as the target dataset, and vice versa. The first row in each table shows baseline results when training a Faster R-CNN (FRCNN) on the respective source dataset (i.e., no domain adaptation). The second row in each table shows baseline results when training an FPN 202 on the respective source dataset (i.e., no domain adaptation). The third row in each table shows baseline results when performing domain adaptation using an existing technique, namely Strong-Weak Distribution Alignment (SWDA) (which builds on FRCNN). The fourth row shows results when performing domain adaptation using SWDA along with the introduced RLA module 208. The fifth row in each table shows results when performing domain adaptation using an embodiment of the introduced technique (an embodiment including use of the FPA module 204, RPA module 206, and RLA module 208).

TABLE 3

Cross-domain results between Legal and Chn. Best results in bold.

|  | Legal → Chn | | | | | | Chn → Legal | | | | | |
|---|---|---|---|---|---|---|---|---|---|---|---|---|
|  | text | list | heading | table | FIG. | mAP | text | list | heading | table | FIG. | mAP |
| FRCNN (source-only) | 73.7 | 57.9 | 74.8 | 66.2 | 76.5 | 69.8 | 60.7 | 50.9 | 30.7 | 47.2 | 24.1 | 42.7 |
| FPN (source-only) | 75.0 | 67.3 | 80.3 | 65.1 | 85.2 | 74.6 | 59.0 | 54.5 | 26.4 | 53.2 | 24.7 | 43.6 |
| SWDA | 74.9 | 67.7 | 73.8 | 74.0 | 86.6 | 75.4 | 52.2 | 51.1 | 31.9 | 58.1 | 29.9 | 44.6 |
| SWDA + RLA | 75.4 | 73.2 | 79.1 | 78.7 | 87.7 | 78.8 | 59.2 | 57.0 | 33.0 | 56.0 | 28.9 | 46.8 |
| FPN + FPA + RPA + RLA | 76.8 | 75.5 | 79.2 | 72.5 | 88.2 | 78.5 | 62.7 | 62.3 | 35.5 | 57.9 | 26.9 | 49.1 |

TABLE 4

Cross-domain results between PubMed and Chn. Best results in bold.

| | Chn → PubMed | | | | | | PubMed → Chn | | | | | |
|---|---|---|---|---|---|---|---|---|---|---|---|---|
| | text | list | heading | table | FIG. | mAP | text | list | heading | table | FIG. | mAP |
| FRCNN (source-only) | 41.3 | 14.3 | 45.4 | 67.4 | 57.4 | 45.2 | 26.6 | 17.7 | 19.6 | 45.5 | 51.9 | 32.3 |
| FPN (source-only) | 47.2 | 19.5 | 47.1 | 64.3 | 64.7 | 48.6 | 38.4 | 25.0 | 26.7 | 45.9 | 28.7 | 32.9 |
| SWDA | 56.0 | 20.3 | 52.2 | 81.2 | 44.5 | 50.9 | 53.0 | 18.5 | 35.0 | 64.7 | 64.3 | 47.1 |
| SWDA + RLA | 50.6 | 24.3 | 50.5 | 74.6 | 59.2 | 51.8 | 48.9 | 25.3 | 39.8 | 60.0 | 74.3 | 49.7 |
| FPN + FPA + RPA + RLA | 55.8 | 28.6 | 54.1 | 79.6 | 52.5 | 54.1 | 36.7 | 44.4 | 42.1 | 64.3 | 79.4 | 53.4 |

TABLE 5

Cross-domain results between Legal and PubMed. Best results in bold.

| | Legal → PubMed | | | | | | PubMed → Legal | | | | | |
|---|---|---|---|---|---|---|---|---|---|---|---|---|
| | text | list | heading | table | FIG. | mAP | text | list | heading | table | FIG. | mAP |
| FRCNN (source-only) | 61.7 | 44.9 | 75.2 | 72.0 | 65.4 | 63.8 | 37.3 | 37.3 | 27.1 | 29.8 | 8.3 | 28.0 |
| FPN (source-only) | 60.9 | 51.5 | 74.6 | 69.6 | 67.8 | 64.9 | 35.3 | 41.4 | 28.5 | 30.5 | 3.7 | 27.8 |
| SWDA | 66.0 | 23.3 | 81.0 | 85.1 | 71.4 | 65.3 | 37.3 | 36.1 | 44.0 | 48.5 | 10.5 | 35.3 |
| SWDA + RLA | 67.4 | 48.6 | 82.9 | 85.3 | 59.3 | 68.7 | 36.8 | 39.0 | 43.4 | 50.7 | 11.9 | 36.4 |
| FPN + FPA + RPA + RLA | 67.5 | 53.6 | 82.1 | 76.6 | 73.9 | 70.7 | 37.1 | 49.6 | 42.5 | 31.1 | 12.0 | 34.5 |

The results shown above in Tables 3, 4, and 5 demonstrate that use of one example embodiment of the introduced technique (including the FPA module 204, RPA module 206, and RLA module 208) improves model accuracy over the baselines (FRCNN, FPN, and SWDA) in almost all cases. The results also show that adding the introduced document-specific RLA module 208 to an existing domain alignment technique (SWDA) also results in consistent performance gains in almost all cases. Accordingly, the introduced technique for domain alignment represents a significant technological improvement in the field of machine-learning-based object detection in images. Again, the results shown in Tables 3, 4, and 5 are provided for illustrative purposes and are not to be construed as limiting or representative of the results in all embodiments or scenarios.

6.5 Use with Natural Images

Embodiments of the introduced technique can also be applied to adapt models for cross-domain detection of objects in natural scene images as well. An experiment was conducted to evaluate the performance of an embodiment of the introduced technique in cross-domain "car" detection using the Cityscape and Kitti datasets. In this experiment, the domain gap is represented by the different image characteristics (e.g., light levels, image capture device, location, etc.) between the two datasets. Table 6 below shows the mAP across classes when using Kitti as the source dataset and Cityscape as the target dataset, and vice versa. The first row of Table 6 shows the average precision (AP) for detecting a "car" when applying an existing domain alignment technique, namely SWDA. The second row shows the AP for detecting a "car" when applying an embodiment of the introduced technique. The embodiment of the introduced technique used in this experiment only uses the FPA module 204 and RPA module 206 on top of the FPN 202 since the RLA module 208 is more applicable for use in DOD tasks on documents with layer information.

TABLE 6

Cross-domain detection results for natural scene images. Best results in bold.

| | Kitti → Cityscape | Cityscape → Kitti |
|---|---|---|
| SWDA | 41.8 | 70.6 |
| FPN + FPA + RPA | 42.9 | 73.3 |

The results in Table 6 show that the evaluated embodiment of the introduced technique also outperforms SWDA for the natural scene image cross-domain detection task, especially for adaptation from Cityscape to Kitti, where the embodiment of the introduced technique achieves a 2.7% improvement for the AP when detecting a "car." This experiment further substantiates the efficacy of the introduced technique.

7. Visualization of Detection Results

FIG. 11 shows an example visualization generated by using an object detection model that has been adapted for cross-domain object detection according to the introduced technique. Specifically, FIG. 11 shows an example visualization in the form of labeled bounding boxes based on an image of a document from the Chn dataset. The bounding boxes in the example visualization of FIG. 11 are colored based on object classification (e.g., red=list, magenta=table, blue=text, cyan=figure, and yellow=heading). In some embodiments, visualization may be generated as an overlay to the original input image. In other words, the overlay may not impact the underlying image. In this example, the object detection model may have been pretrained based on labeled images of English documents and adapted to generate inferences based on Chinese documents. As shown in FIG. 4, the introduced technique is able to successfully decompose a complex page into semantically meaningful regions, with high localization precision and confident classification scores for objects of extremely diverse sizes. For example, in the first image on the left, both the large table which covers about two-thirds of the page and the tiny pagination are perfectly detected.

8. Example Computer System

Figure 12:
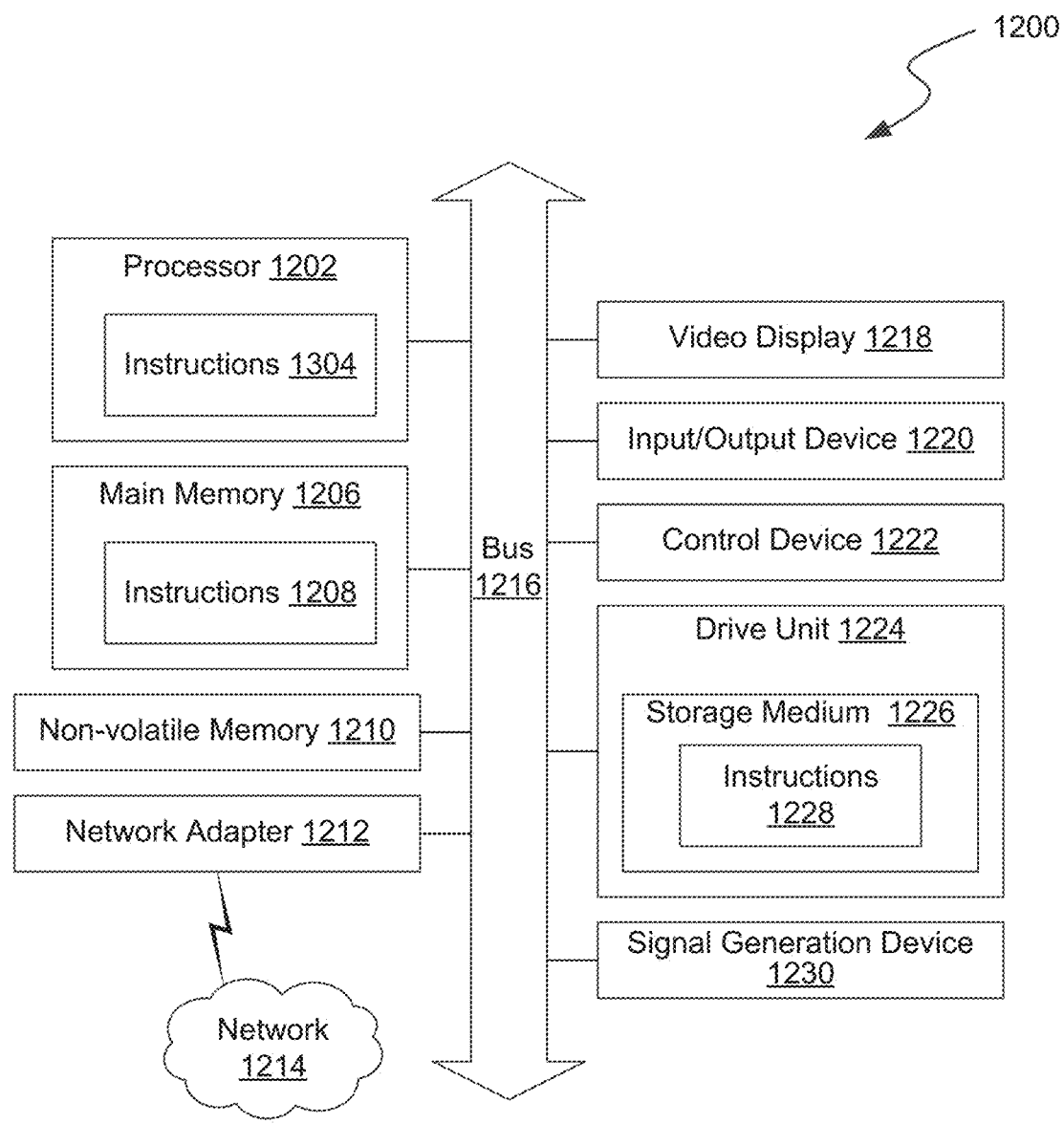
FIG. 12 shows a block diagram of an example computer system in which at least some operations associated with an embodiment of the introduced technique can be performed.

FIG. 12 is a block diagram illustrating an example of a computer system 1200 in which at least some operations described herein can be implemented.

The computer system 1200 may include one or more processing units or ("processors") 1202, main memory 1206, non-volatile memory 1210, network adapter 1212 (e.g., network interface), video display 1218, input/output devices 1220, control device 1222 (e.g., keyboard and pointing devices), drive unit 1224 including a storage medium 1226, and signal generation device 1230 that are communicatively connected to a bus 1216. The bus 1216 is illustrated as an abstraction that represents one or more physical buses and/or point-to-point connections that are connected by appropriate bridges, adapters, or controllers. The bus 1216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 1200 may share a similar computer processor architecture as that of a server computer, a desktop computer, a tablet computer, a personal digital assistant (PDA), a mobile phone, a wearable electronic device (e.g., a watch or fitness tracker), a network-connected ("smart") device (e.g., a television or home assistant device), virtual/augmented reality systems (e.g., a head-mounted display), or any other electronic device capable of executing a set of instructions (sequential or otherwise) that specify action(s) to be taken by the computer system 1200.

The one or more processors 1202 may include central processing units (CPUs), graphics processing units (GPUs), application specific integrated circuits (ASICs), programmable logic devices (PLDs), field programmable gate arrays (FPGAs), and/or any other hardware devices for processing data.

While the main memory 1206, non-volatile memory 1210, and storage medium 1226 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1228. The term "machine-readable medium" and "storage medium" shall also be taken to include any medium that is capable of storing, encoding, or carrying a set of instructions for execution by the computer system 1200.

In some cases, the routines executed to implement certain embodiments of the disclosure may be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in a computing device. When read and executed by the one or more processors 1202, the instruction(s) cause the computer system 1200 to perform operations to execute elements involving the various aspects of the disclosure.

Operation of the main memory 1206, non-volatile memory 1210, and/or storage medium 1226, such as a change in state from a binary one (1) to a binary zero (0) (or vice versa) may comprise a visually perceptible physical change or transformation. The transformation may include a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1210, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 1212 enables the computer system 1200 to mediate data in a network 1214 with an entity that is external to the computer system 1200 through any communication protocol supported by the computer system 1200 and the external entity. The network adapter 1212 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1212 may include a firewall that governs and/or manages permission to access/proxy data in a computer network as well as tracks varying levels of trust between different machines and/or applications. The firewall can be any quantity of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

9. Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for adapting an object detection model for use with data associated with a target domain, the object detection model pretrained based on a source dataset, the source dataset including labeled image data associated with a source domain that is different than the target domain, the method comprising:
    inputting, into the object detection model, batches of the source dataset and batches of a target dataset;
    wherein the target dataset includes image data associated with the target domain;
    generating, using the object detection model, based on the batches of the source dataset and the batches of the target dataset, a plurality of region proposals;
    wherein a given region proposal of the plurality of region proposals is indicative of a prediction, by the object detection model, of a bounded region in a given image where a detected object resides;
    generating, using a segmentation network, based on an image in one or more of the source dataset or target dataset, a dense segmentation map, the dense segmentation map indicative of a drawing type that each pixel in the image belongs to;
    training, using an instance-level domain alignment objective and a rendering layer segmentation objective as objective functions, the object detection model to generate domain-agnostic region proposals;
    wherein the instance-level domain alignment objective is based on the plurality of region proposals and the rendering layer segmentation objective is based on the dense segmentation map; and
    generating, using the object detection model, one or more cross-domain object detection inferences.

2. The method of claim 1, wherein the batches of the source dataset and the batches of the target dataset are alternately input into the object detection model.

3. The method of claim 1, further comprising:
    determining, using a binary domain classifier, a plurality of binary domain predictions, wherein a given binary domain prediction of the plurality of binary domain predictions is indicative of a prediction, by the binary domain classifier, or whether a given region proposal corresponds to the source domain or the target domain;
    wherein the instance-level domain alignment objective is further based on the plurality of binary domain predictions.

4. The method of claim 3, wherein training the object detection model includes adjusting a parameter of the object detection model to reduce an accuracy of the binary domain classifier.

5. The method of claim 3, further comprising:
    training the binary domain classifier using the instance-level domain alignment objective.

6. The method of claim 1, further comprising:
    generating, using the object detection model, based on the batches of the source dataset and the batches of the target dataset, a plurality of feature maps; and
    training, using a pixel-level domain alignment objective, the object detection model to generate domain-agnostic feature maps;
    wherein the pixel-level domain alignment objective is based on the plurality of feature maps.

7. The method of claim 6,
    wherein the pixel-level domain alignment objective is associated with a first objective function;
    wherein the instance-level domain alignment objective is associated with a second objective function; and
    wherein training the object detection model includes:
        adjusting one or more parameters of the object detection model to minimize an overall loss, the overall loss based on a sum of the first objective function and the second objective function.

8. The method of claim 6, further comprising:
    generating, using a second binary domain classifier, based on the plurality of feature maps, a second plurality of binary domain predictions, each of the second plurality of binary domain predictions indicative of a prediction, by the second binary domain classifier, of whether a given pixel in a given feature map is associated with the source domain or the target domain;
    wherein the pixel-level domain alignment objective is based on the second plurality of binary domain predictions.

9. The method of claim 8,
    wherein the plurality of feature maps include:
        a first feature map at a first resolution; and
        a second feature map at a second resolution that is different than the first resolution, wherein the first feature map and second feature map are part of a feature pyramid output by a feature pyramid network (FPN) associated with the object detection model;

wherein the second binary domain classifier includes:
  a first resolution-specific domain classifier associated with the first resolution; and
  a second resolution-specific domain classifier associated with the second resolution; and wherein generating the second plurality of binary domain predictions includes:
  generating, using the first resolution-specific domain classifier, based on the first feature map, a first binary domain prediction of the second plurality of binary domain predictions, the first binary domain prediction indicative of a prediction, by the first resolution-specific domain classifier, of whether a given pixel in the first feature map is associated with the source domain or the target domain; and
  generating, using the second resolution-specific domain classifier, based on the second feature map, a second binary domain prediction of the second plurality of binary domain predictions, the second binary domain prediction indicative of a prediction, by the second resolution-specific domain classifier, of whether a given pixel in the second feature map is associated with the source domain or the target domain.

10. The method of claim 1,
wherein the object detection model includes an FPN and a region proposal network (RPN);
wherein inputting, into the object detection model, the batches of the source dataset and the batches of the target dataset includes:
  inputting, into the FPN, the batches of the source dataset and the batches of the target dataset; and
  generating, using the FPN, based on the batches of the source dataset and the batches of the target dataset, a plurality of feature maps; and
wherein generating, using the object detection model, the plurality of region proposals includes:
  inputting, into the RPN, the plurality of feature maps;
  wherein the plurality of region proposals are generated, using the RPN, based on the plurality of feature maps.

11. The method of claim 1, wherein training the object detection model includes:
for a particular batch of the source dataset:
training the object detection model using a first overall objective function;
wherein the first overall objective function is based on an object detection objective and the instance-level domain alignment objective; and
for a particular batch of the target dataset:
training the object detection model using a second overall objective function;
wherein the second overall objective function is based on the instance-level domain alignment objective but not the object detection objective.

12. The method of claim 3, further comprising:
determining, for each of the plurality of binary domain predictions, a probability value indicating a likelihood that the given region proposal is associated with the source domain or the target domain as predicted by the binary domain classifier;
wherein the instance-level domain alignment objective includes a focal loss term configured to assign increased weight to region proposals having lower corresponding probability values compared to region proposals having greater corresponding probability values.

13. The method of claim 1, wherein enabling cross-domain object detection inferences includes:
deploying the object detection model for use in an image processing tool after training the object detection model.

14. The method of claim 13, wherein the image processing tool is any of a computing device or an application.

15. The method of claim 13, further comprising:
inputting, to the deployed object detection model, an image associated with the target domain, wherein the image is not included in the target dataset; and
generating, using the object detection model, based on the image, an object detection inference, the object detection inference indicative of a detected object in the image.

16. The method of claim 1, wherein image data in the source dataset and/or target dataset include any one or more of:
  digital documents;
  digital scans;
  digital artwork; or
  digital natural scene images.

17. The method of claim 1,
wherein the labeled image data associated with the source domain includes documents in a first language;
wherein the image data associated with the target domain includes documents in a second language; and
wherein the first language is different than the second language.

18. The method of claim 1, wherein the source domain and target domain are associated with any of an image type, an image format, a document type, a document format, a language, or an industry.

19. A computer system for adapting an object detection model for use with data in a target domain, the object detection model pretrained based on a source dataset, the source dataset including labeled image data associated with a source domain that is different than the target domain, the computer system comprising:
a processor; and
a memory coupled to the processor, the memory having instructions stored thereon, which when executed by the processor, cause the computer system to:
  input, into the object detection model, batches of the source dataset and batches of a target dataset;
  wherein the target dataset includes image data associated with the target domain;
  generate, using the object detection model, based on the batches of the source dataset and the batches of the target dataset, a plurality of region proposals;
  wherein a given region proposal of the plurality of region proposals is indicative of a prediction, by the object detection model, of a bounded region in a given image where a detected object resides;
  generate, using a segmentation network, based on an image in one or more of the source dataset or target dataset, a dense segmentation map, the dense segmentation map indicative of a drawing type that each pixel in the image belongs to;
  train, using an instance-level domain alignment objective and a rendering layer segmentation objective as objective functions, the object detection model to generate domain-agnostic region proposals;

wherein the instance-level domain alignment objective is based on the plurality of region proposals and the rendering layer segmentation objective is based on the dense segmentation map; and generate, using the object detection model, one or more cross-domain object detection inferences.

20. A non-transitory, computer-readable medium with instructions stored thereon which, when executed by a computer system, cause the computer system to perform operations comprising:

inputting, into an object detection model, batches of a source dataset and batches of a target dataset;

wherein the target dataset includes image data associated with a target domain and the source dataset includes labeled image data associated with a source domain that is different than the target domain;

generating, using the object detection model, based on the batches of the source dataset and the batches of the target dataset, a plurality of region proposals;

wherein a given region proposal of the plurality of region proposals is indicative of a prediction, by the object detection model, of a bounded region in a given image where a detected object resides;

generating, using a segmentation network, based on an image in one or more of the source dataset or target dataset, a dense segmentation map, the dense segmentation map indicative of a drawing type that each pixel in the image belongs to;

training, using an instance-level domain alignment objective and a rendering layer segmentation objective as objective functions, the object detection model to generate domain-agnostic region proposals;

wherein the instance-level domain alignment objective is based on the plurality of region proposals and the rendering layer segmentation objective is based on the dense segmentation map; and generating, using the object detection model, one or more cross-domain object detection inferences.

* * * * *